(12) United States Patent
Suzuki et al.

(10) Patent No.: US 9,503,225 B2
(45) Date of Patent: Nov. 22, 2016

(54) TERMINAL, BASE STATION, WIRELESS COMMUNICATION METHOD, AND INTEGRATED CIRCUIT

(71) Applicant: Sharp Kabushiki Kaisha, Osaka-shi, Osaka (JP)

(72) Inventors: Shoichi Suzuki, Osaka (JP); Toshizo Nogami, Osaka (JP); Kimihiko Imamura, Osaka (JP)

(73) Assignee: SHARP KABUSHIKI KAISHA, Osaka (JP)

( * ) Notice: Subject to any disclaimer, the term of this patent is extended or adjusted under 35 U.S.C. 154(b) by 90 days.

(21) Appl. No.: 14/429,374

(22) PCT Filed: Aug. 30, 2013

(86) PCT No.: PCT/JP2013/073282
§ 371 (c)(1),
(2) Date: Mar. 19, 2015

(87) PCT Pub. No.: WO2014/045834
PCT Pub. Date: Mar. 27, 2014

(65) Prior Publication Data
US 2015/0222395 A1 Aug. 6, 2015

(30) Foreign Application Priority Data
Sep. 20, 2012 (JP) .................................. 2012-206798

(51) Int. Cl.
*H04L 1/18* (2006.01)
*H04L 5/26* (2006.01)
(Continued)

(52) U.S. Cl.
CPC ........... *H04L 1/1861* (2013.01); *H04L 1/1812* (2013.01); *H04L 1/1854* (2013.01);
(Continued)

(58) Field of Classification Search
CPC . H04L 1/1861; H04L 1/1864; H04L 1/1854; H04L 5/0055; H04L 1/1812; H04W 36/04; H04W 72/00; H04W 72/0413; H04W 72/042; H04W 74/006
See application file for complete search history.

(56) References Cited

U.S. PATENT DOCUMENTS

| | | | | |
|---|---|---|---|---|
| 2013/0121304 A1* | 5/2013 | Nory | ..................... | H04L 1/1861 370/330 |
| 2013/0315195 A1 | 11/2013 | Ko et al. | | |
| 2014/0029584 A1* | 1/2014 | Qu | ..................... | H04W 72/042 370/336 |

FOREIGN PATENT DOCUMENTS

| | | |
|---|---|---|
| EP | 2 675 078 A2 | 12/2013 |
| WO | 2012/108716 A2 | 8/2012 |

OTHER PUBLICATIONS

Samsung, "HARQ-ACK PUCCH Resources in Response to ePDCCH Detections", 3GPP TSG RAN WG1 #69, R1-122259, May 12, 2012, pp. 1-2.
(Continued)

*Primary Examiner* — Timothy J Weidner
(74) *Attorney, Agent, or Firm* — Keating & Bennett, LLP

(57) ABSTRACT

A terminal includes a determination unit that determines a PUCCH resource based on at least a first value in a case where downlink control information is detected with a PDCCH and a second value is not set, determines a PUCCH resource based on at least the second value in a case where the downlink control information is detected with the PDCCH and the second value is set, and determines the PUCCH resource based on at least the third value for the ePDCCH set with which the downlink control information is detected regardless of whether or not the second value is set in a case where the downlink control information is detected with the ePDCCH in the ePDCCH set. With this feature, a HARQ-ACK to a transport block transmitted on the PDSCH can be efficiently transmitted and received using a PUCCH.

12 Claims, 18 Drawing Sheets

(51) Int. Cl.
H04W 72/04 (2009.01)
H04L 5/00 (2006.01)
(52) U.S. Cl.
CPC .......... H04L1/1887 (2013.01); H04L 5/0055 (2013.01); H04W 72/042 (2013.01); H04W 72/0413 (2013.01)

(56) References Cited

OTHER PUBLICATIONS

Samsung, "Uplink Control Signaling for UL CoMP", 3GPP TSG RAN WG1 #70, R1-123481, Aug. 5, 2012, 3 pages.
Official Communication issued in International Patent Application No. PCT/JP2013/073282, mailed on Sep. 24, 2013.
3GPP TS 36.211 V10.5.0, "3rd Generation Partnership Project; Technical Specification Group Radio Access Network; Evolved Universal Terrestrial Radio Access (E-UTRA); Physical Channels and Modulation (Release 10)," Jun. 2012, pp. 1-101.
3GPP TS 36.213 V10.6.0, "3rd Generation Partnership Project; Technical Specification Group Radio Access Network; Evolved Universal Terrestrial Radio Access (E-UTRA); Physical Layer Procedures (Release 10)," Jun. 2012, pp. 1-125.
Sharp, "Details of eREG and eCCE Structures," 3GPP TSG RAN WG1 Meeting #70, R1-123264, Aug. 13, 2012, 9 pages.
Kddi, "Views on Remaining Issues of PUCCH Resource and Sequence," 3GPP TSG RAN WG1 Meeting #70, R1-123241, Aug. 13, 2012, pp. 1-5.
InterDigital Communications, LLC., "On PUCCH Resource Allocation for ePDCCH Based A/N," 3GPP TSG-RAN WG1 Meeting #70, R1-123413, Aug. 13, 2012, 3 pages.
Intel Corporation, "On PUCCH Sequences and Resource Allocation for UL CoMP," 3GPP TSG-RAN WG1 Meeting #70, R1-123179, Aug. 13, 2012, pp. 1-6.
Pantech, "Remaining Issues for PUCCH Enhancements," 3GPP TSG RAN WG1 Meeting #70, R1-123327, Aug. 13, 2012, pp. 1-3.

* cited by examiner

FIG. 9

| $n^{(1,p)}_{PUCCH}$ | m | ORTHOGONAL SEQUENCE INDEX $n^{(p)}_{OC}$ | CYCLIC SHIFT INDEX $n^{(p)}_{CS}$ |
|---|---|---|---|
| 0+36×k | k | 0 | 0 |
| 1+36×k | k | 0 | 1 |
| 2+36×k | k | 0 | 2 |
| 3+36×k | k | 0 | 3 |
| 4+36×k | k | 0 | 4 |
| 5+36×k | k | 0 | 5 |
| 6+36×k | k | 0 | 6 |
| 7+36×k | k | 0 | 7 |
| 8+36×k | k | 0 | 8 |
| 9+36×k | k | 0 | 9 |
| 10+36×k | k | 0 | 10 |
| 11+36×k | k | 0 | 11 |
| 12+36×k | k | 1 | 0 |
| 13+36×k | k | 1 | 1 |
| 14+36×k | k | 1 | 2 |
| 15+36×k | k | 1 | 3 |
| 16+36×k | k | 1 | 4 |
| 17+36×k | k | 1 | 5 |
| 18+36×k | k | 1 | 6 |
| 19+36×k | k | 1 | 7 |
| 20+36×k | k | 1 | 8 |
| 21+36×k | k | 1 | 9 |
| 22+36×k | k | 1 | 10 |
| 23+36×k | k | 1 | 11 |
| 24+36×k | k | 2 | 0 |
| 25+36×k | k | 2 | 1 |
| 26+36×k | k | 2 | 2 |
| 27+36×k | k | 2 | 3 |
| 28+36×k | k | 2 | 4 |
| 29+36×k | k | 2 | 5 |
| 30+36×k | k | 2 | 6 |
| 31+36×k | k | 2 | 7 |
| 32+36×k | k | 2 | 8 |
| 33+36×k | k | 2 | 9 |
| 34+36×k | k | 2 | 10 |
| 35+36×k | k | 2 | 11 |

TERMINAL, BASE STATION, WIRELESS COMMUNICATION METHOD, AND INTEGRATED CIRCUIT

TECHNICAL FIELD

The present invention relates to a terminal, a base station, a wireless communication method, and an integrated circuit.

BACKGROUND ART

A radio access method and a radio network for cellular mobile communication (hereinafter referred to as "Long Term Evolution (LTE)", or "Evolved Universal Terrestrial Radio Access (EUTRA)") have been considered in the 3rd Generation Partnership Project (3GPP). In LTE, an Orthogonal Frequency Division Multiplexing (OFDM) scheme is used as a downlink communication scheme. In LTE, a Single-Carrier Frequency Division Multiple Access (SC-FDMA) scheme is used as an uplink communication scheme. In LTE, a base station is referred to as an evolved NodeB (eNodeB) and a mobile station (a terminal) is referred to as a User Equipment (UE). LTE is a cellular communication system in which the area covered by a base station is arranged in a cellular pattern into multiple cells, each served by a base station. A single base station may manage multiple cells. A single mobile station performs communication in single or multiple cells. The cell is also referred to as a serving cell.

In LTE, a Hybrid Automatic Repeat request (HARQ) to uplink data is supported. In a case where decoding of a transport block received on a Physical Downlink Shared Channel (PDSCH) succeeds, the mobile station in LTE transmits a positive acknowledgement (acknowledgement) (ACK) to the transport block on a PUCCH. Furthermore, in a case where the decoding of the transport block received on the PDSCH fails, the mobile station in LTE transmits a negative acknowledgement (NACK) to the transport block on the Physical Uplink Control Channel (PUCCH).

The base station in LTE performs scheduling of the transport block based on the ACK or the NACK received on the PUCCH. For example, in a case where the NACK is received, the base station in LTE retransmits the transport block. The ACK and the NACK are collectively referred to as a HARQ-ACK.

Furthermore, the base station in LTE transmits downlink control information that is used in the scheduling of the PDSCH, on a Physical Downlink Control Channel (PDCCH).

The mobile station in LTE determines a PUCCH resource that is used in the transmission of the HARQ-ACK based on a PDCCH resource with which the downlink control information is detected. Accordingly, the base station in LTE can dynamically change allocation of the PUCCH resource by adjusting the PDCCH resource that is used in the transmission of the downlink control information. Furthermore, the base station in LTE can cause multiple mobile stations not to transmit the HARQ-ACK on the same PUCCH resource (NPL 1 and NPL 2).

In the 3GPP, it has been considered to introduce an enhanced Physical Downlink Control Channel (ePDCCH) in order to increase the number of mobile stations that are accommodated in a cell (NPL 3). An ePDCCH resource is different from the PDCCH resource in the related art. To be more precise, the introduction of the ePDCCH extends the resource that can be used in the transmission of the downlink control information.

Furthermore, in the 3GPP, it has been considered to introduce Coordinated Multi-Point transmission and reception (CoMP) by which the mobile station can efficiently communicate with multiple base stations (NPL 4). For example, a certain base station may receive the HARQ-ACK to the transport block that is received by the mobile station from a different base station.

CITATION LIST

Non-Patent Document

NPL 1: 3rd Generation Partnership Project; 3GPP TS 36.211 v10.5.0, Evolved Universal Terrestrial Radio Access (E-UTRA); Physical Channels and Modulation, 26 Jun. 2012.

NPL 2: 3rd Generation Partnership Project; 3GPP TS 36.213 v10.6.0, Evolved Universal Terrestrial Radio Access (E-UTRA); Physical layer procedure, 26 Jun. 2012.

NPL 3: "Details of eREG and eCCE structures", R1-123264, 3GPP TSG-RAN WG1 Meeting #70, Qingdao, China, 13-17 Aug. 2012.

NPL 4: "Views on Remaining Issues of PUCCH Resource and Sequence", R1-123241, 3GPP TSG-RAN WG1 Meeting #70, Qingdao, China, 13-17 Aug. 2012.

DISCLOSURE OF THE INVENTION

Problems to be Solved by the Invention

However, in a base station that communicates with a mobile station which attempts to detect downlink control information with the PDCCH and the ePDCCH, preferably, the PUCCH resource that is used in the transmission of the HARQ-ACK is allocated in such a manner as not to overlap a PUCCH resource that is used by a different mobile station, but a method of allocating the PUCCH resource that is used in the transmission of the HARQ-ACK has not been sufficiently considered.

An object of the present invention, which is made in view of the problem described above, is to provide a mobile station, a base station, a wireless communication method, and an integrated circuit for efficiently transmitting and receiving, with the use of PUCCH, a HARQ-ACK to a transport block transmitted on a PDSCH.

Means for Solving the Problems (1) To accomplish the object described above, the present invention provides the following measures. That is, according to an aspect of the present invention, there is provided a terminal including: a detection unit that detects downlink control information that is used in scheduling of a PDSCH, with a PDCCH or an ePDCCH; a reception unit that receives a transport block on the PDSCH scheduled by the downlink control information, receives a system information block which includes information indicating a first value, receives information indicating a second value, together with information indicating a value of identity for a PUCCH, and receives information indicating a third value for an ePDCCH set; a determination unit that determines a PUCCH resource based on at least the first value in a case where the downlink control information is detected with the PDCCH and the second value is not set, determines the PUCCH resource based on at least the second value in a case where the downlink control information is detected with the PDCCH and the second value is set, and determines the PUCCH resource based on at least the third value for the ePDCCH set with which the downlink control information is detected regardless of whether or not the second value is set in a case where the downlink control information is detected with the ePDCCH in the ePDCCH set; and a transmission unit that transmits a HARQ-ACK to the transport block received through the PDSCH scheduled by the downlink control information, on the determined PUCCH resource.

(2) Furthermore, according to the present invention, the terminal may further include a generation unit that generates a reference signal which is transmitted together with the PUCCH based on the value of the identity for the PUCCH in a case where the value of the identity for the PUCCH is set, and that generates the reference signal that is transmitted together with the PUCCH based on a physical layer cell identity in a case where the value of the identity for the PUCCH is not set.

(3) Furthermore, according to the present invention, in the terminal, the information indicating the first value may be common among multiple mobile stations.

(4) Furthermore, according to another aspect of the present invention, there is provided a base station including: a transmission unit that transmits downlink control information that is used in scheduling of a PDSCH, on a PDCCH or an ePDCCH, transmits a transport block on the PDSCH scheduled by the downlink control information, transmits a system information block which includes information indicating a first value, transmits information indicating a second value, together with information indicating a value of identity for a PUCCH, and transmits information indicating a third value for an ePDCCH set; a determination unit that determines a PUCCH resource based on at least the first value in a case where the downlink control information is transmitted on the PDCCH and information indicating the second value is not transmitted, determines the PUCCH resource based on at least the second value in a case where the downlink control information is transmitted on the PDCCH and the information indicating the second value is transmitted, and determines the PUCCH resource based on at least the third value for the ePDCCH set on which the downlink control information is transmitted regardless of whether or not the information indicating the second value is transmitted in a case where the downlink control information is transmitted on the ePDCCH in the ePDCCH set; and a reception unit that receives a HARQ-ACK to the transport block transmitted through the PDSCH scheduled by the downlink control information, on the determined PUCCH resource.

(5) Furthermore, according to the present invention, the reception unit may receive a reference signal that is generated by the terminal based on the value of the identity and perform demodulating processing of the PUCCH based on the reference signal in a case where information indicating the value of the identity is transmitted, and the reception unit may receive the reference signal that is generated by the terminal based on a value of a physical layer cell identity and perform the demodulating processing of the PUCCH based on the reference signal in a case where the information indicating the value of the identity is not transmitted.

(6) Furthermore, according to the present invention, the information indicating the first value may be common among multiple mobile stations.

(7) Furthermore, according to a still another aspect of the present invention, there is provided a wireless communication method that is used in a terminal, the method including: detecting downlink control information that is used in scheduling of a PDSCH, with a PDCCH or an ePDCCH; receiving a transport block on the PDSCH scheduled by the downlink control information; receiving a system information block which includes information indicating a first value; receiving information indicating a second value, together with information indicating a value of identity for a PUCCH; receiving information indicating a third value for an ePDCCH set; determining a PUCCH resource based on at least the first value in a case where the downlink control information is detected with the PDCCH and the second value is not set; determining the PUCCH resource based on at least the second value in a case where the downlink control information is detected with the PDCCH and the second value is set; determining the PUCCH resource based on at least the third value for the ePDCCH set with which the downlink control information is detected regardless of whether or not the second value is set in a case where the downlink control information is detected with the ePDCCH in the ePDCCH set; and transmitting a HARQ-ACK to the transport block received through the PDSCH scheduled by the downlink control information, on the determined PUCCH resource.

(8) Furthermore, according to the present invention, the wireless communication method may further include: generating a reference signal which is transmitted together with the PUCCH based on the value of the identity for the PUCCH in a case where the value of the identity for the PUCCH is set; and generating the reference signal that is transmitted together with the PUCCH based on a physical layer cell identity in a case where the value of the identity for the PUCCH is not set.

(9) Furthermore, according to the present invention, the information indicating the first value may be common among multiple mobile stations.

(10) Furthermore, according to a still another aspect of the present invention, there is provided a wireless communication method that is used in a base station, the method including: transmitting downlink control information that is used in scheduling of a PDSCH, on a PDCCH or an ePDCCH; transmitting a transport block on the PDSCH scheduled by the downlink control information; transmitting a system information block which includes information indicating a first value; transmitting information indicating a second value, together with information indicating a value of identity for a PUCCH; transmitting information indicating a third value for an ePDCCH set; determining a PUCCH resource based on at least the first value in a case where the downlink control information is transmitted on the PDCCH and information indicating the second value is not transmitted; determining the PUCCH resource based on at least the second value in a case where the downlink control information is transmitted on the PDCCH and the information indicating the second value is transmitted; determining the PUCCH resource based on at least the third value for the ePDCCH set on which the downlink control information is transmitted regardless of whether or not the information indicating the second value is transmitted in a case where the downlink control information is transmitted on the ePDCCH in the ePDCCH set; and receiving a HARQ-ACK to the transport block transmitted through the PDSCH scheduled by the downlink control information, on the determined PUCCH resource.

(11) Furthermore, according to the present invention, the wireless communication method may further include receiving a reference signal that is generated by the terminal based on the value of the identity and performing demodulating processing of the PUCCH based on the reference signal in a case where information indicating the value of the identity is transmitted; and receiving the reference signal that is generated by the terminal based on a value of a physical layer cell identity and performing the demodulating processing of the PUCCH based on the reference signal in a case where the information indicating the value of the identity is not transmitted.

(12) Furthermore, according to the present invention, the information indicating the first value may be common among multiple mobile stations.

(13) Furthermore, according to a still another aspect of the invention, there is provided an integrated circuit that is built into a terminal, the integrated circuit causing the terminal to perform a series of functions, including: a function of detecting downlink control information that is used in scheduling of a PDSCH, with a PDCCH or an ePDCCH; a function of receiving a transport block on the PDSCH scheduled by the downlink control information; a function of receiving a system information block which includes information indicating a first value; a function of receiving information indicating a second value, together with information indicating a value of identity for a PUCCH; a function of receiving information indicating a third value for an ePDCCH set; a function of determining a PUCCH resource based on at least the first value in a case where the downlink control information is detected with the PDCCH and the second value is not set; a function of determining the PUCCH resource based on at least the second value in a case where the downlink control information is detected with the PDCCH and the second value is set; a function of determining the PUCCH resource based on at least the third value for the ePDCCH set with which the downlink control information is detected regardless of whether or not the second value is set in a case where the downlink control information is detected with the ePDCCH in the ePDCCH set; and a function of transmitting a HARQ-ACK to the transport block received through the PDSCH scheduled by the downlink control information, on the determined PUCCH resource.

(14) Furthermore, according to the present invention, the integrated circuit may cause the terminal to further perform: a function of generating a reference signal which is transmitted together with the PUCCH based on the value of the identity for the PUCCH in a case where the value of the identity for the PUCCH is set; and a function of generating the reference signal that is transmitted together with the PUCCH based on a physical layer cell identity in a case where the value of the identity for the PUCCH is not set.

(15) Furthermore, according to the present invention, the information indicating the first value may be common among multiple mobile stations.

Effects of the Invention

According to the present invention, each of the mobile station and the base station can efficiently transmit and receive, with the use of PUCCH, the HARQ-ACK to the transport block transmitted on the PDSCH.

BRIEF DESCRIPTION OF THE DRAWINGS

FIG. 9 is a diagram illustrating a correspondence between an index of a PUCCH resource and the PUCCH resource according to the present embodiment.

MODE FOR CARRYING OUT THE INVENTION

Embodiments of the present invention will be described below.

According to the present embodiment, a mobile station performs transmission and reception in a single cell. However, the present invention also can be applied to a case where the mobile station performs the transmission and reception in multiple cells at the same time. A technology in which the mobile station communicates with multiple cells is referred to as a cell aggregation or a carrier aggregation. The present invention may be applied to each of the multiple cells that are aggregated. Furthermore, the present invention may be applied to some of multiple cells that are aggregated.

The present embodiment will be described below referring to a Frequency Division Duplex (FDD) mode wireless communication system. However, the present invention also can be applied to a Time Division Duplex (TDD) mode wireless communication system. Furthermore, the present invention also can be applied to a wireless communication system in which a cell that uses the TDD mode and a cell that uses the FDD mode are aggregated.

Figure 1:
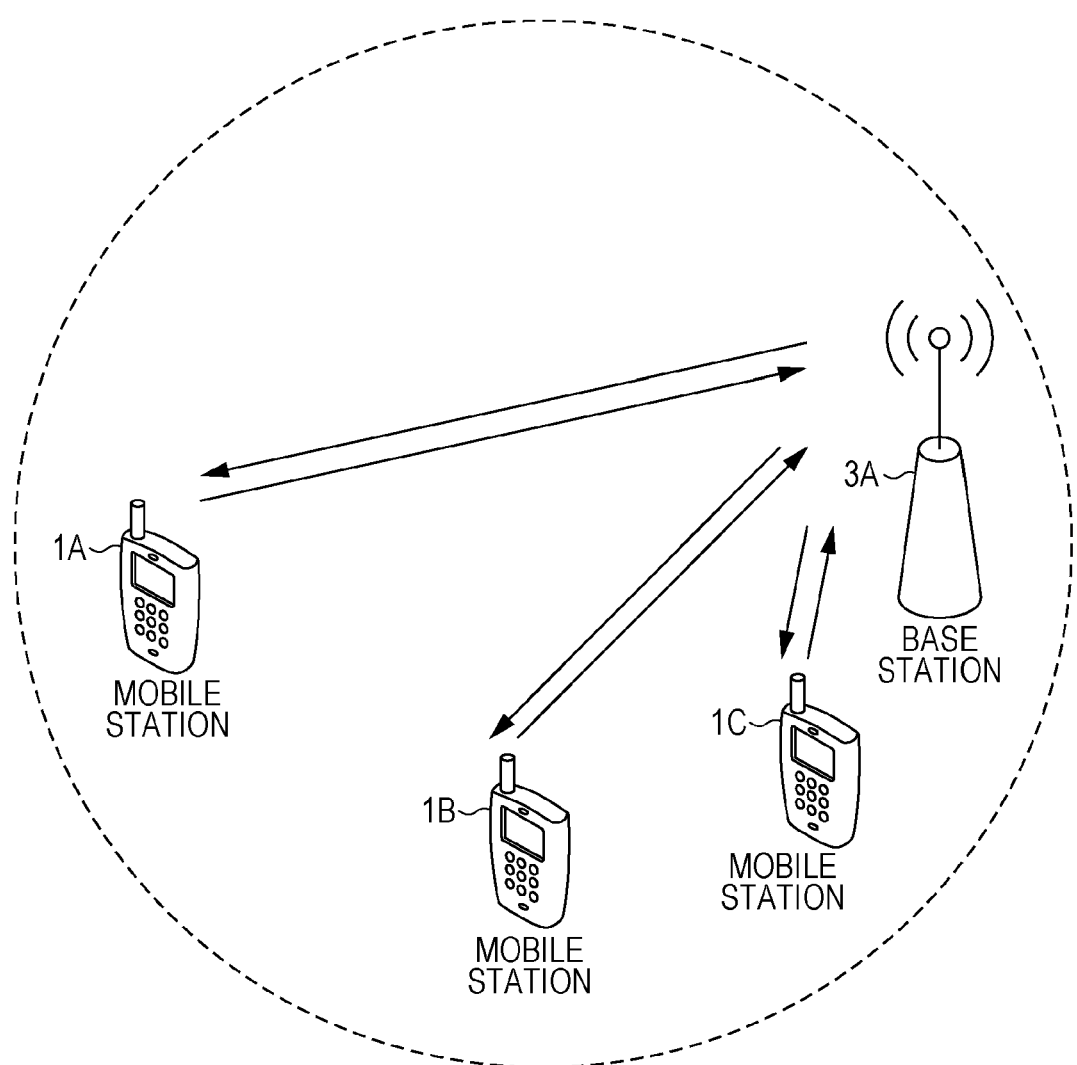
FIG. 1 is a schematic diagram of a wireless communication system according to the present embodiment.

FIG. 1 is a schematic diagram of the wireless communication system according to the present embodiment. In FIG.

1, the wireless communication system includes mobile stations 1A to 1C, and a base station 3. The mobile stations 1A to 1C are hereinafter referred to as mobile stations 1.

A physical channel and a physical signal according to the present embodiment will be described below.

In FIG. 1, the following uplink physical channels are used for uplink communication from the mobile station 1 to the base station 3. The uplink physical channel is used to transmit information that is output from a higher layer.
Physical Uplink Control Channel (PUCCH)
Physical Uplink Shared Channel (PUSCH)
Physical Random Access Channel (PRACH)

The PUCCH is used to transmit Uplink Control Information (UCI). A HARQ-ACK (HARQ feedback, response information) to Downlink-Shared Channel (DL-SCH) is included in the Uplink Control Information.

The PUSCH is used to transmit Uplink-Shared Channel (UL-SCH). The PUSCH may be used to transmit the Uplink Control Information along with uplink data. The PUSCH may be used to transmit only the Uplink Control information.

The mobile station 1 configures whether or not the PUSCH and the PUCCH are transmitted at the same time based on information (signaling) received from the base station 3. In a case where the mobile station 1 configures the PUSCH and the PUCCH not to be transmitted at the same time and the PUSCH is transmitted in a subframe n, the mobile station 1 transmits the HARQ-ACK on the PUSCH in the subframe n, except for a case where the PUSCH is transmitted as part of a contention based random access procedure on the PUSCH. In a case where the mobile station 1 configures the PUSCH and the PUCCH not to be transmitted at the same time and the PUSCH is not transmitted in the subframe n, the mobile station 1 transmits the HARQ-ACK on the PUCCH in the subframe n.

In a case where the mobile station 1 configures the PUSCH and the PUCCH to be transmitted at the same time, the mobile station 1 transmits the HARQ-ACK on the PUCCH regardless of whether or not the PUSCH is transmitted in the subframe n.

The PRACH is used to transmit a random access preamble. A main object of the PRACH is for the mobile station 1 to be synchronized to the base station 3 in terms of a time domain.

In FIG. 1, the following uplink physical signal is used for the uplink wireless communication. The uplink physical signal is not used to transmit the information that is output from the higher layer, but is used by a physical layer.
Uplink Reference Signal (UL RS)

According to the present embodiment, the following 2 types of uplink reference signal are used.
Demodulation Reference Signal (DMRS)
Sounding Reference Signal (SRS)

The DMRS is associated with the transmission of the PUSCH or the PUCCH. The DMRS is time-multiplexed together with the PUSCH or the PUCCH. The base station 3 performs demodulation processing of the PUSCH or the PUCCH by using the DMRS. Transmission of the PUSCH and the DMRS taken together is hereinafter simply also referred to as transmission of the PUSCH. Transmission of the PUCCH and the DMRS taken together is hereinafter simply also referred to as transmission of the PUCCH.

The SRS is not associated with the transmission of the PUSCH or the PUCCH. The base station 3 uses the SRS in order to measure an uplink channel state. A symbol that transmits the SRS is also referred to as a sounding reference symbol. The SRS will be described in detail below.

In FIG. 1, the following downlink physical channels are used for downlink wireless communication from the base station 3 to the mobile station 1. The downlink physical channels are used to transmit the information that is output from the higher layer.
Physical Broadcast Channel (PBCH)
Physical Control Format Indicator Channel (PCFICH)
Physical Hybrid automatic repeat request Indicator Channel (PHICH)
Physical Downlink Control Channel (PDCCH)
enhanced Physical Downlink Control Channel (ePDCCH)
Physical Downlink Shared Channel (PDSCH)

The PBCH is used to broadcast system information (Broadcast Channel (BCH)) that is used in common in the mobile station 1. The PBCH is transmitted at an interval of 40 ms. Timings at an interval of 40 ms are blind-detected in the mobile station 1. Furthermore, the PBCH is retransmitted at an interval of 10 ms.

The PCFICH is used to transmit information indicating a domain (an OFDM symbol) that is reserved for transmission of the PDCCH.

The PHICH is used to transmit a HARQ indicator (the HARQ feedback, the response information) indicating the HARQ-ACK to an Uplink Shared Channel (UL-SCH) that is received by the base station 3. For example, in a case where the mobile station 1 receives the HARQ indicator indicating ACK, a corresponding uplink data is not retransmitted. For example, in a case where the mobile station 1 receives the HARQ indicator indicating NACK, the corresponding uplink data is retransmitted.

The PDCCH and the ePDCCH are used to transmit downlink control information (DCI). The downlink control information is also referred to as DCI format. The downlink control information includes a downlink grant (downlink assignment, or also referred to as "downlink assignment") and an uplink grant. The downlink grant is the downlink control information that is used for scheduling of a single PDSCH within a single cell. The downlink grant is used for the scheduling of the PDSCH within a subframe that is the same as the subframe in which the downlink grant is transmitted. The uplink grant is the downlink control information that is used for scheduling of a single PUSCH within a single cell. The uplink grant is used for the scheduling of the single PUSCH within the fourth or later subframe after the subframe in which the uplink grant is transmitted.

The PDSCH is used to transmit downlink data (Downlink Shared Channel (DL-SCH)).

In FIG. 1, the following downlink physical signals are used for the downlink wireless communication. The downlink physical signal is not used to transmit the information that is output from the higher layer, but is used by the physical layer.
Synchronization signal (SS)
Downlink Reference Signal (DL RS)

The synchronization signal is used in order for the mobile station 1 to be synchronized in terms of a downlink frequency domain and time domain.

The downlink reference signal is used in order for the mobile station 1 to perform channel reconfiguration of the downlink physical channel. The downlink reference signal is used in order for the mobile station 1 to calculate downlink channel state information.

The downlink physical channel and the downlink physical signal are collectively referred to as a downlink signal. The uplink physical channel and the uplink physical signal are collectively referred to as an uplink signal. The downlink physical channel and the uplink physical channel are collectively referred to as a physical channel. The downlink physical signal and the uplink physical signal are collectively referred to as a physical signal.

A BCH, a UL-SCH, and a DL-SCH are transport channels. A channel that is used in a Medium Access Control (MAC) layer is referred to as the transport channel. Furthermore, the transport channel is also referred to as a transport block.

A configuration of a radio frame according to the present embodiment will be described below.

Figure 2:
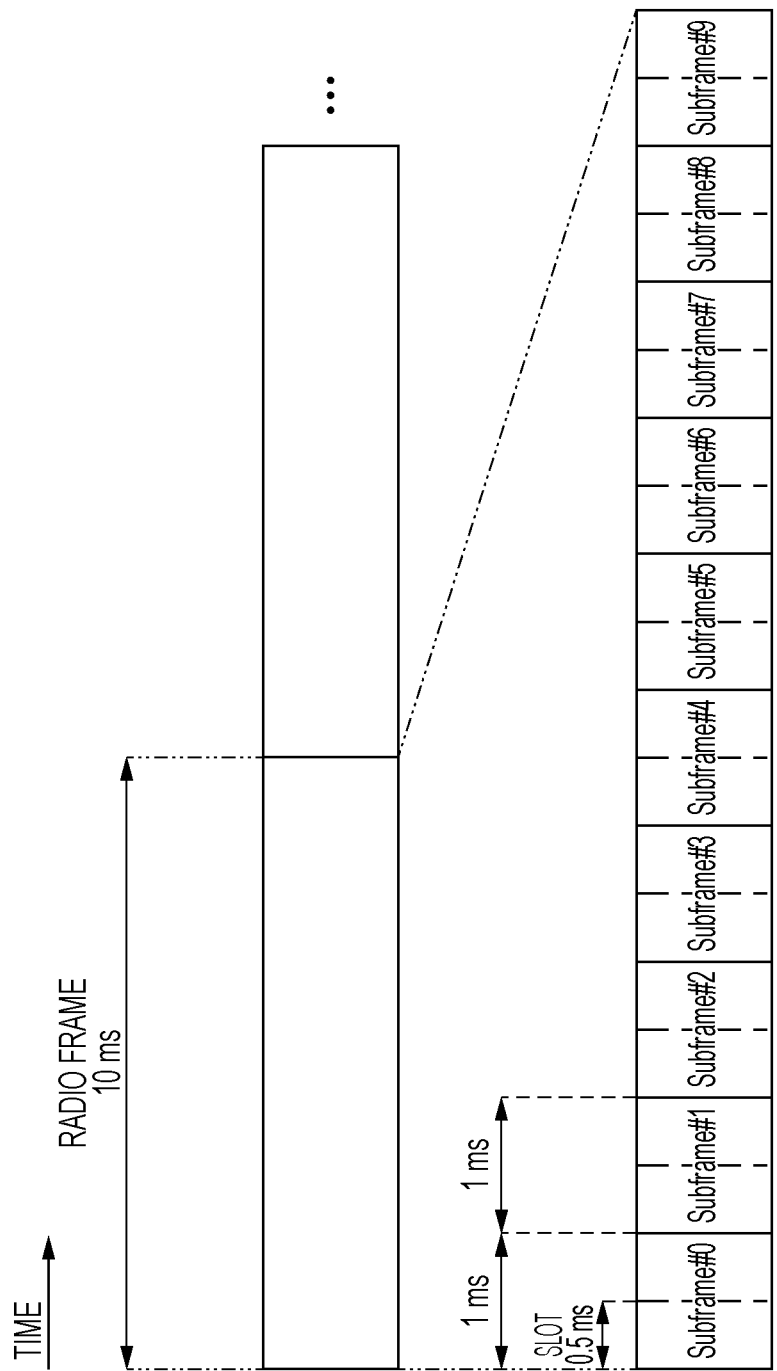
FIG. 2 is a diagram illustrating a schematic configuration of a radio frame according to the present embodiment.

FIG. 2 is a diagram illustrating a schematic configuration of the radio frame according to the present embodiment. Each of the radio frames is 10 ms in length. Furthermore, each of the radio frames is configured from 10 subframes. Each of the subframes is 1 ms in length, and is defined by two consecutive slots. An i-th subframe within the radio frame is configured from a (2×i)-th slot and a (2×i+1)-th slot. Each of the slots is 0.5 ms in length.

A configuration of the slot according to the present embodiment will be described below.

Figure 3:
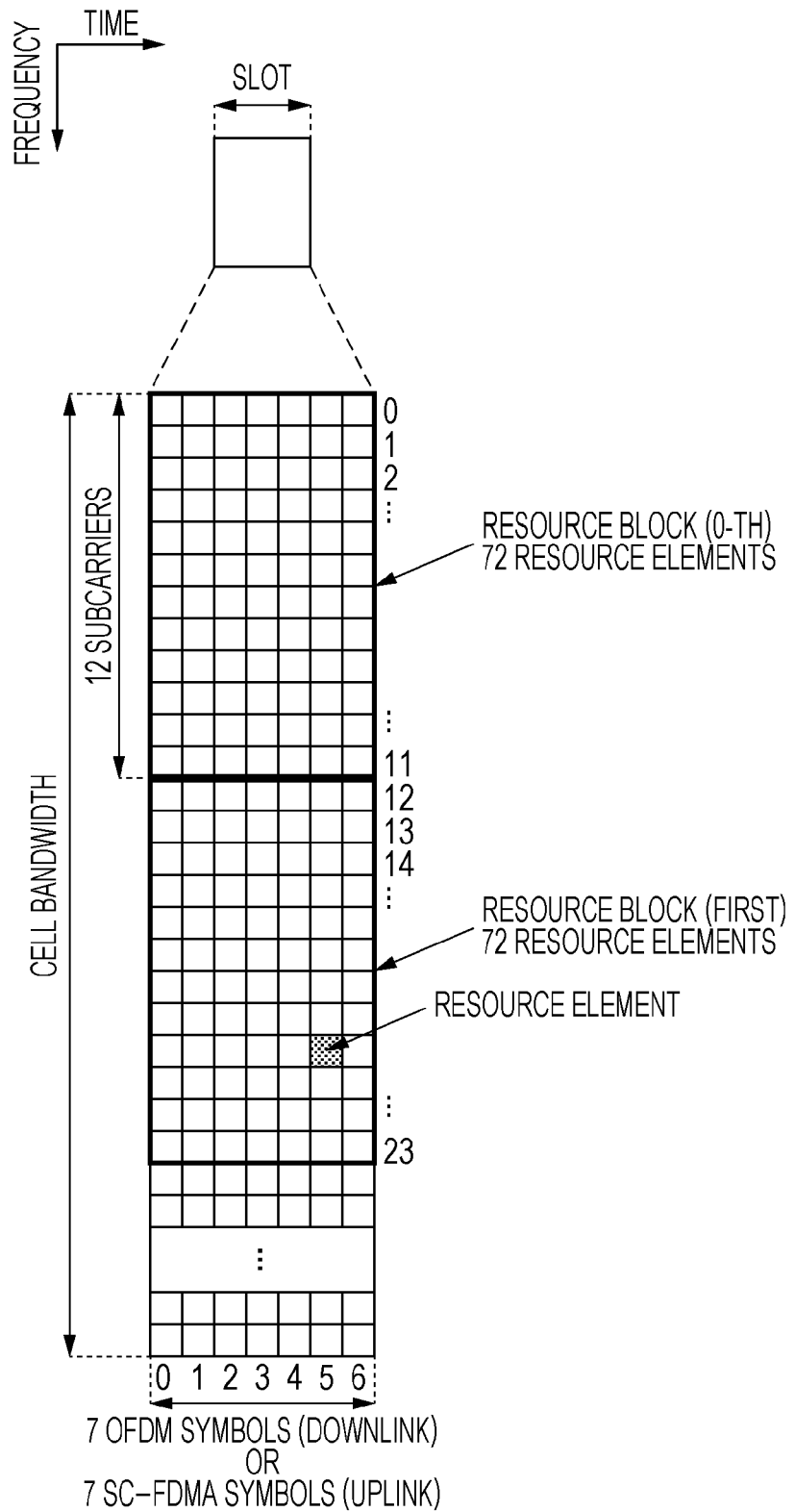
FIG. 3 is a diagram illustrating a configuration of a slot according to the present embodiment.

FIG. 3 is a diagram illustrating the configuration of the slot according to the present embodiment. The physical signal or physical channel that is transmitted in each of the slots is expressed by a resource grid. In the downlink, a resource grid is defined by multiple subcarriers and multiple OFDM symbols. In the uplink, the resource grid is defined by multiple subcarriers and multiple SC-FDMA symbols. The number of subcarriers that constructs one slot depends on an uplink bandwidth or a downlink bandwidth for a cell. The number of OFDM symbols or SC-FDMA symbols that construct one slot is 7. Each of the elements within the resource grid is referred to as a resource element. The resource element is identified using a subcarrier number, and an OFDM symbol number or an SC-FDMA symbol number.

A resource block is used to express mapping of a certain physical channel (the PDSCH, the PUSCH, or the like) to elements. The resource block is defined by a virtual resource block and a physical resource block. A certain physical channel is first mapped to the virtual resource block. Thereafter, the virtual resource block is mapped to the physical resource block. One physical resource block is defined by 7 consecutive OFDM symbols or SC-FDMA symbols in the time domain and by 12 consecutive subcarriers in the frequency domain. Therefore, one physical resource block is configured from (7×12) resource elements. Furthermore, one physical resource block corresponds to one slot in the time domain, and corresponds to 180 kHz in the frequency domain. The physical resource block is numbered from 0 in the frequency domain.

The physical channel and the physical signal that are transmitted in each of the subframes will be described below.

Figure 4:
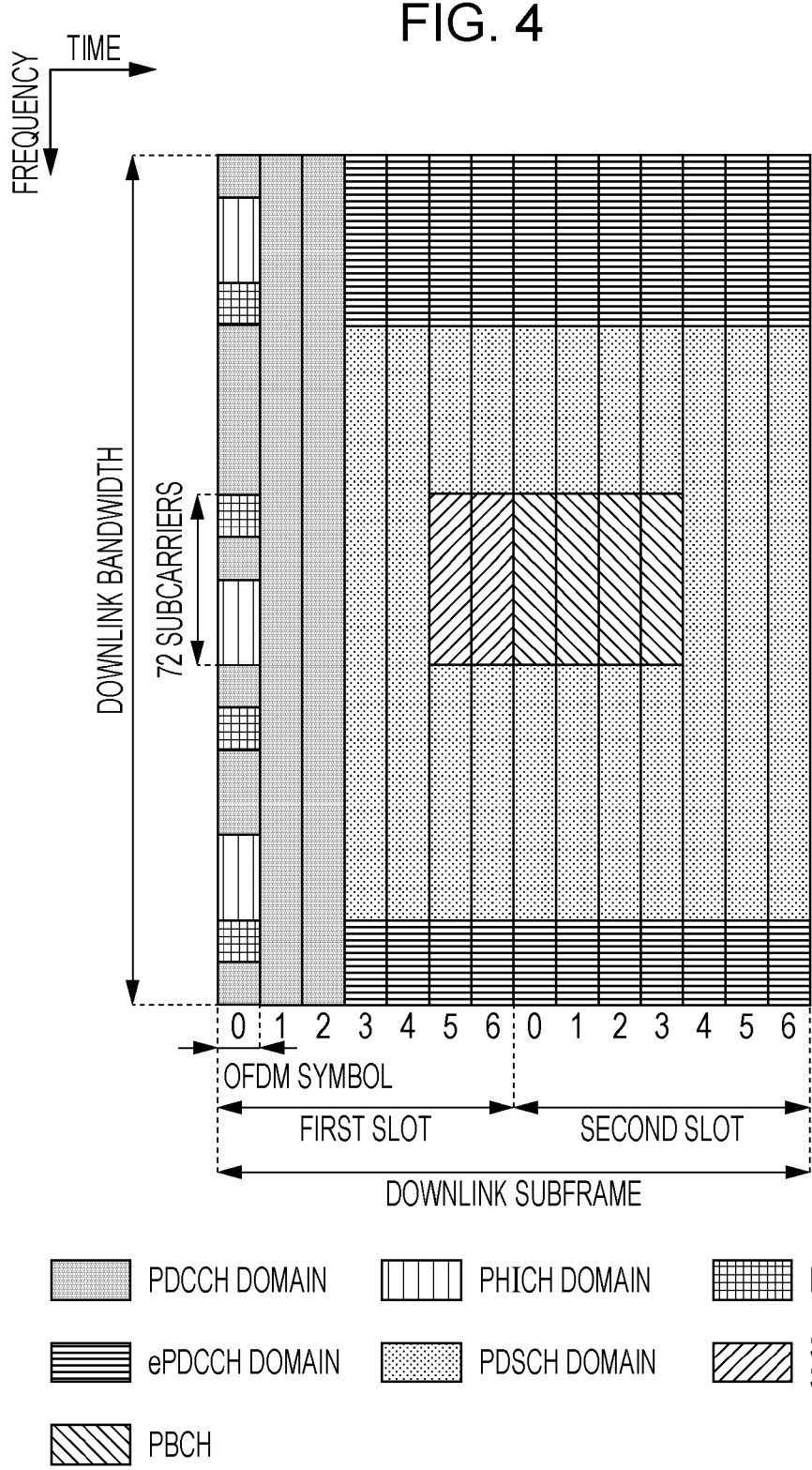
FIG. 4 is a diagram illustrating one example of arrangement of physical channels and physical signals in a downlink subframe according to the present embodiment.

FIG. 4 is a diagram illustrating one example of arrangement of the physical channels and the physical signals in a downlink subframe according to the present embodiment. In the downlink subframe, the base station 3 can transmit the downlink physical channel (the PBCH, the PCFICH, the PHICH, the PDCCH, the ePDCCH, the PDSCH), and the downlink physical signal (the synchronization signal, the downlink reference signal). Moreover, the PBCH is transmitted only in a subframe 0 within the radio frame. Moreover, the synchronization signal is arranged only in subframes 0 and 5 within the radio frame. Moreover, the downlink reference signal is arranged in the resource elements that are distributed in the frequency domain and the time domain. The downlink reference signal is not illustrated in FIG. 4 for brief description.

In a PDCCH domain, multiple PDCCH's are frequency- and time-multiplexed. In an ePDCCH domain, multiple ePDCCH's are frequency- and time-multiplexed. In a PDSCH domain, multiple PDSCH's are frequency- and space-multiplexed. The PDCCH, the PDSCH, and the ePDCCH are time-multiplexed. The ePDCCH and the PDSCH are frequency-multiplexed.

Figure 5:
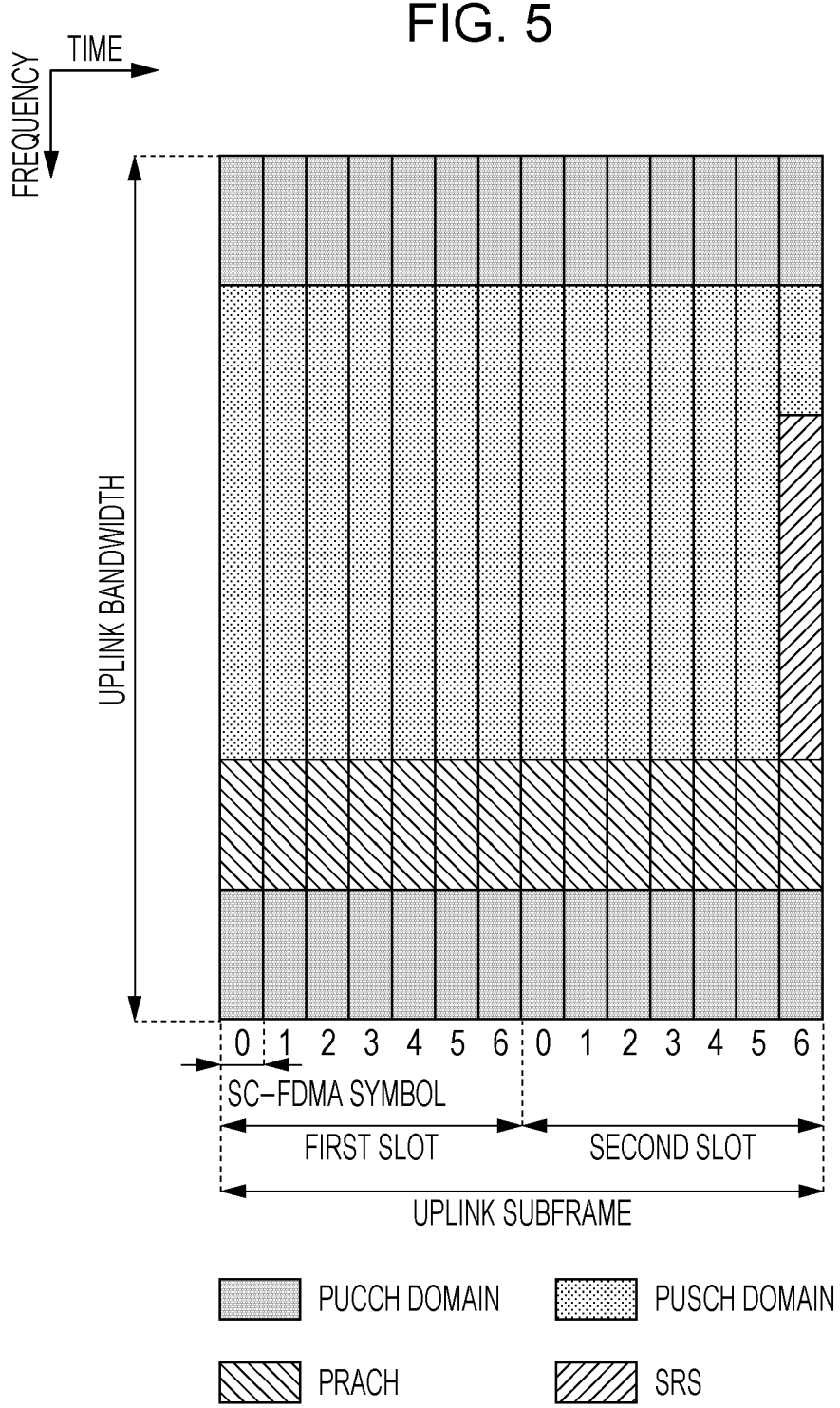
FIG. 5 is a diagram illustrating one example of arrangement of the physical channels and the physical signals in an uplink subframe according to the present embodiment.

FIG. 5 is a diagram illustrating one example of arrangement of the physical channels and the physical signals in an uplink subframe according to the present embodiment. In the uplink subframe, the mobile station 1 can transmit the uplink physical channel (the PUCCH, the PUSCH, the PRACH) and the uplink physical signal (the DMRS, the SRS).

In a PUCCH domain, multiple PUCCH's that are transmitted by the multiple mobile stations 1 are frequency-, time-, and code-multiplexed. A single mobile station 1 can transmit one PUCCH in a single uplink subframe. In a PUSCH domain, multiple PUSCH's are frequency- and space-multiplexed. A single mobile station 1 can transmit a single PUSCH in a single uplink subframe in a single cell. The PUCCH and the PUSCH are frequency-multiplexed. A single mobile station 1 can transmit a single PUSCH and a single PUCCH at the same time in a single uplink subframe in a single cell. The PRACH is arranged over a single subframe or two subframes. Multiple PRACH's that are transmitted by the multiple mobile stations 1 are code-multiplexed. A single mobile station 1 does not transmit the PRACH and a different uplink signal at the same time in a single cell.

The SRS is transmitted using the last SC-FDMA symbol within the uplink subframe. The mobile station 1 cannot transmit the SRS and the PUCCH/PUSCH/PRACH at the same time in a single SC-FDMA symbol in a single cell. In a single uplink subframe in a single cell, the mobile station 1 can transmit the PUSCH and/or the PUCCH using the SC-FDMA symbol with the last SC-FDMA symbol within the uplink subframe being excluded, and can transmit the SRS using the last SC-FDMA symbol within the uplink subframe. To be more precise, in a single uplink subframe in a single cell, the mobile station 1 can transmit the SRS and the PUSCH/PUCCH at the same time. Moreover, the DMRS is time-multiplexed together with the PUCCH or the PUSCH. The DMRS is not illustrated in FIG. 5 for brief description.

A PDCCH resource will be described below.

The PDCCH is mapped to one PDCCH candidate. One PDCCH candidate is configured from one or multiple Control Channel Elements (CCE's). The CCE is arranged in the PDCCH domain.

Figure 6:
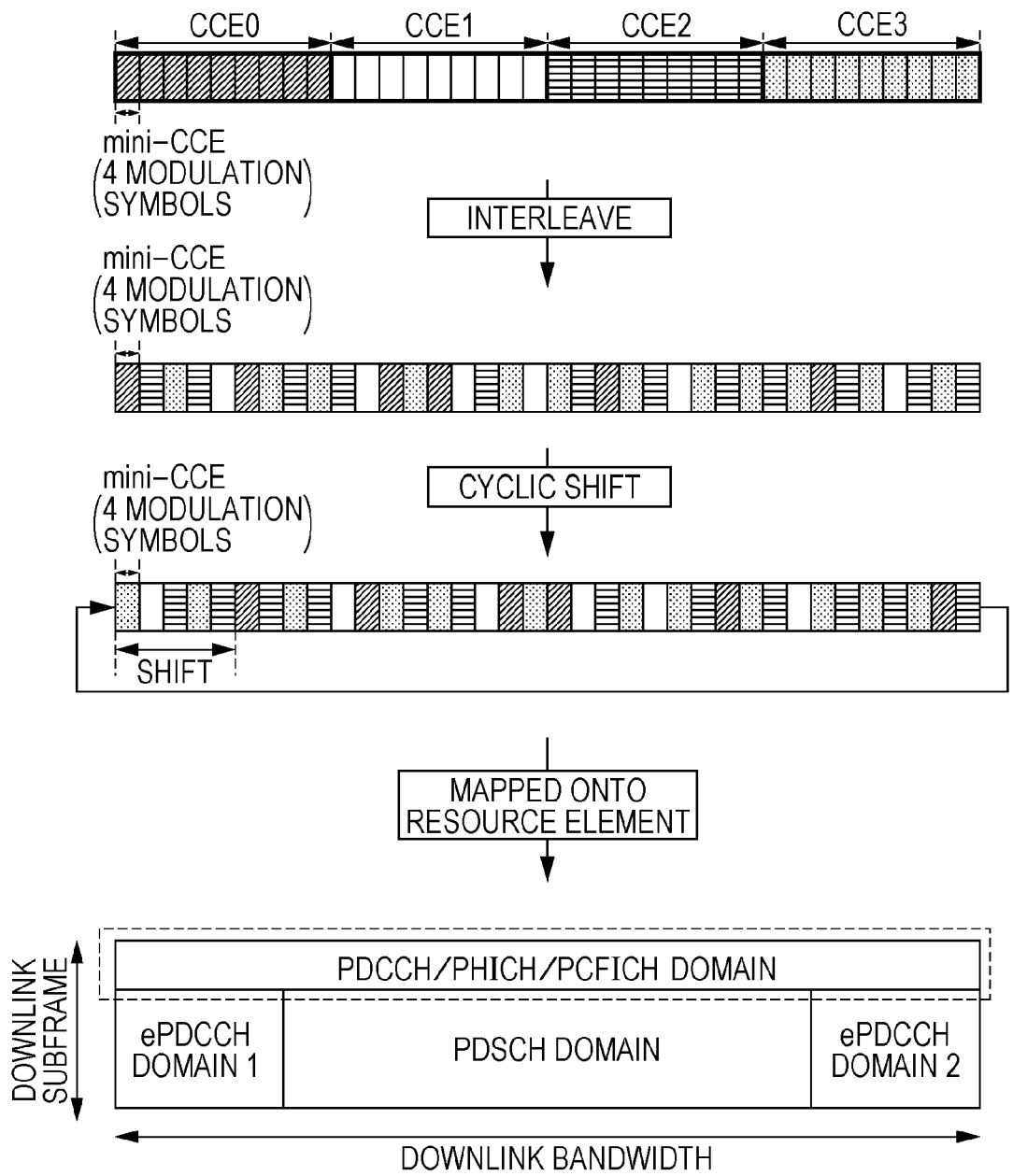
FIG. 6 is a diagram illustrating a method of mapping a PDCCH according to the present embodiment to a resource element.

FIG. 6 is a diagram illustrating a method of mapping the PDCCH according to the present embodiment to the resource element. One CCE is used to transmit 36 modulation symbols (complex-valued symbols). One CCE is configured from 9 mini-CCE's. One mini-CCE's is configured from 4 modulation symbols. The base station 3 maps one mini-CCE to one resource element group. One resource element group is configured from 4 consecutive resource elements in the frequency domain. To be more precise, one modulation symbol is mapped to one resource element.

The base station 3 interleaves the CCE's in units of mini-CCE. Next, the base station 3 cyclic-shifts the mini-CCE's that are interleaved. A value of the cyclic shift is a value of Physical layer Cell Identity (PCI). To be more precise, among cells that have different Physical layer Cell Identities, cyclic shifts having different values are performed. Accordingly, interference with the PDCCH among cells can be randomized. Moreover, the mobile station 1 can detect a physical layer cell identity from the synchronization signal. Furthermore, the base station 3 can transmit a handover command that includes information indicating the physical layer cell identity to the mobile station 1.

Next, the base station 3 maps the cyclic-shifted mini-CCE to the resource element group in the PDCCH/PHICH/PCFICH domain. The base station 3 maps the mini-CCE on the PDCCH to resource elements other than the resource elements to which the PHICH and the PCFICH are mapped.

The ePDCCH resource will be described below.

The ePDCCH is mapped to one ePDCCH candidate. One ePDCCH candidate is configured from one or multiple enhanced Control Channel Elements (eCCE's). Multiple ePDCCH domains may be defined for a single mobile station. The base station 3 transmits information indicating one or multiple physical resource blocks that construct the ePDCCH domain, to the mobile station 1. An eCCE is defined for each of the ePDCCH domains. Furthermore, a single eCCE is arranged in a single ePDCCH domain. The ePDCCH domain is also referred to as an ePDCCH set.

Figure 7:
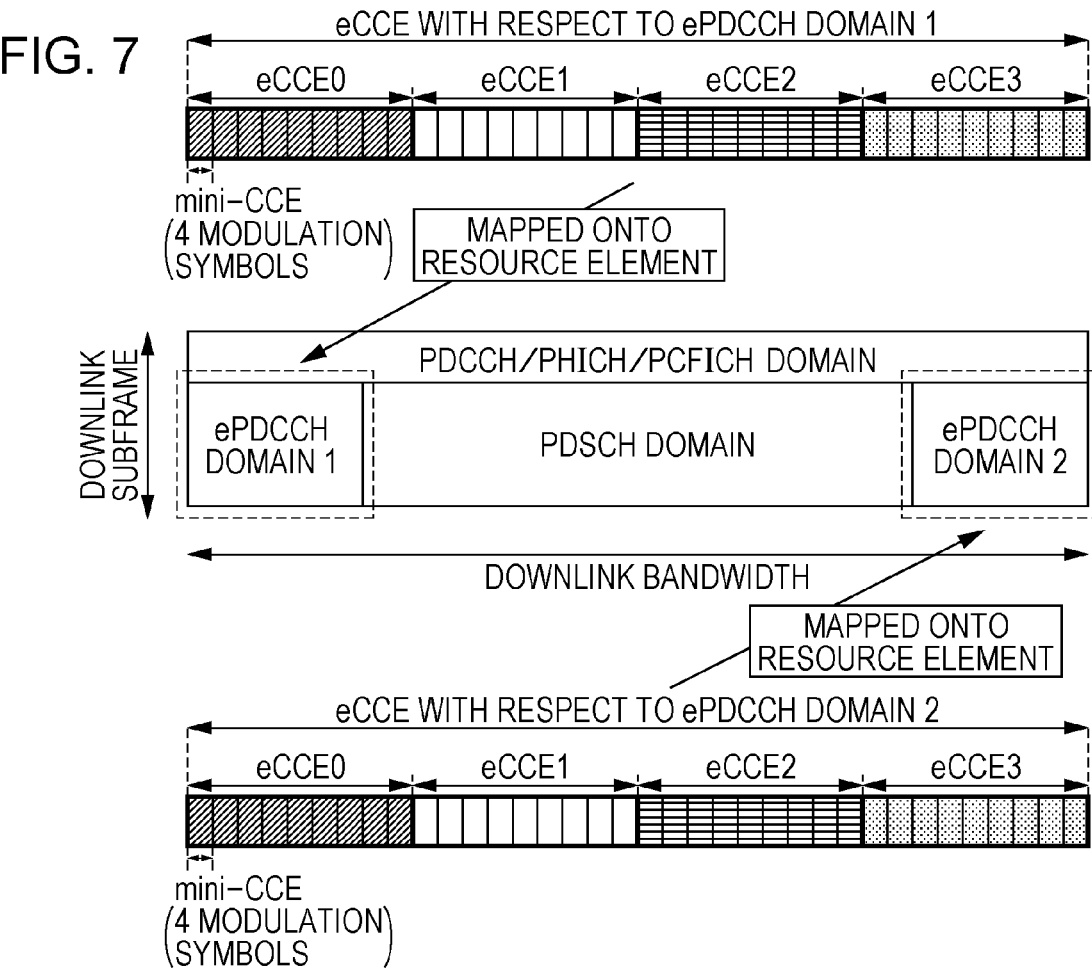
FIG. 7 is a diagram illustrating a method of mapping an ePDCCH according to the present embodiment to the resource element.

FIG. 7 is a diagram illustrating a method of mapping the ePDCCH according to the present embodiment to the resource element. One eCCE is used to transmit multiple modulation symbols (complex-valued symbols). One eCCE is configured from multiple mini-eCCE's. One mini-eCCE is configured from multiple modulation symbols. The base station 3 maps one mini-eCCE to one resource element group. Within the subframe, multiple resource elements that construct two consecutive physical resource blocks in the frequency domain are divided into 16 resource element groups.

In FIG. 7, eCCE's (an eCCE 0, an eCCE 1, an eCCE 2, and an eCCE 3) for an ePDCCH domain 1 are arranged in the resource elements in the ePDCCH domain 1. Furthermore, in FIG. 7, eCCE's (an eCCE 0, an eCCE 1, an eCCE 2, and an eCCE 3) for an ePDCCH domain 2 are arranged in the resource elements in the ePDCCH domain 2. Moreover, according to the present embodiment, eCCE numbers corresponding to each of the ePDCCH domains are assigned starting from 0. Moreover, the eCCE numbers may be assigned over multiple ePDCCH domains. For example, in a case where the eCCE numbers for the ePDCCH domain 1 are 0 to 3, the eCCE numbers for the ePDCCH domain 2 may be assigned starting from 4.

The PUCCH resource will be described below.

Figure 8:
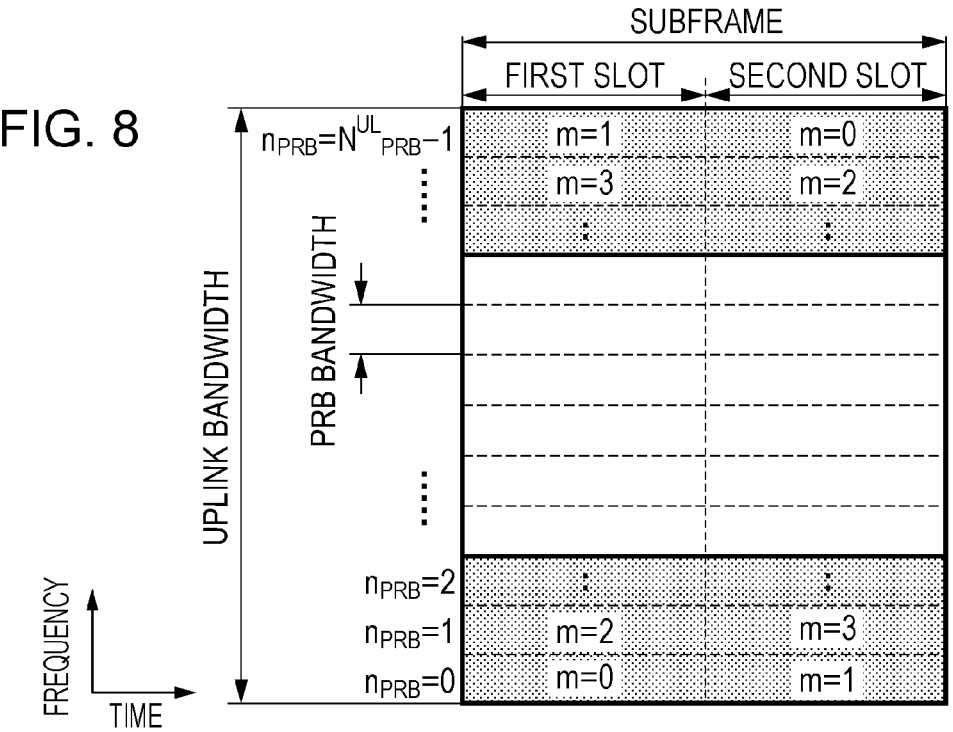
FIG. 8 is a diagram illustrating a physical resource block in which a PUCCH according to the present embodiment is arranged.

FIG. 8 is a diagram illustrating the physical resource block in which the PUCCH according to the present embodiment is arranged. In FIG. 8, $n_{PRB}$ is a physical resource block number in the frequency domain, $N^{UL}_{PRB}$ is the number of physical resource blocks that are included in the uplink bandwidth, and m is a number for identifying the physical resource block in which the PUCCH is arranged.

A single PUCCH is arranged within two physical resource blocks. To be more precise, a single PUCCH is arranged in one physical resource block in a first slot and one physical resource block in a second slot. Furthermore, the one physical resource block in the first slot and the one physical resource block in the second slot are symmetrical about a central frequency in uplink band.

Moreover, multiple PUCCH's are code-multiplexed in the two physical resource blocks. For example, 36 PUCCH's are code-multiplexed in the two physical resource blocks where m=k. For example, the PUCCH resources of which PUCCH resource numbers are (36×k) to (36×k+35) are arranged in the two physical resource blocks where m=k.

According to the present embodiment, in a case where the PUCCH is transmitted using multiple antenna ports, different PUCCH resources are allocated to the antenna ports, and the same HARQ-ACK information is transmitted from each of the antenna ports.

A method of spreading the PUCCH will be described below.

A cyclic shift α and an orthogonal code w(i) are used in the spreading of the PUCCH. To be more precise, a PUCCH resource is specified by a combination of the number m, the cyclic shift α, and the orthogonal code w(i).

In a single PUCCH resource, one of $2\pi \cdot n^{(p)}_{CS}/12$ ($n^{(p)}_{CS}=0, 1, \ldots, 11$) corresponds to the cyclic shift α. $n^{(p)}_{CS}$ is a cyclic shift index. Furthermore, in a single PUCCH resource, w(i) corresponds to one of [+1+1+1+1], [+1 −1+1 −1], and [+1 −1 −1 +1].

FIG. 9 is a diagram illustrating a correspondence between an index of the PUCCH resource and the PUCCH resource according to the present embodiment. In FIG. 9, m is a number for identifying the physical resource block that the PUCCH resource corresponds to, $n^{(1,p)}_{PUCCH}$ is an index of the PUCCH resource that corresponds to an antenna port p, $n^{(p)}_{OS}$ is an orthogonal sequence index for the antenna port p, and $n^{(p)}_{CS}$ is a cyclic shift index for the antenna port p. For example, in FIG. 9, in a case where the index of the PUCCH resource is 1, m is 0, the orthogonal sequence index $n^{(p)}_{OC}$ is 0, and the cyclic shift index $n_{(p)OC}$ is 1.

Figure 10:
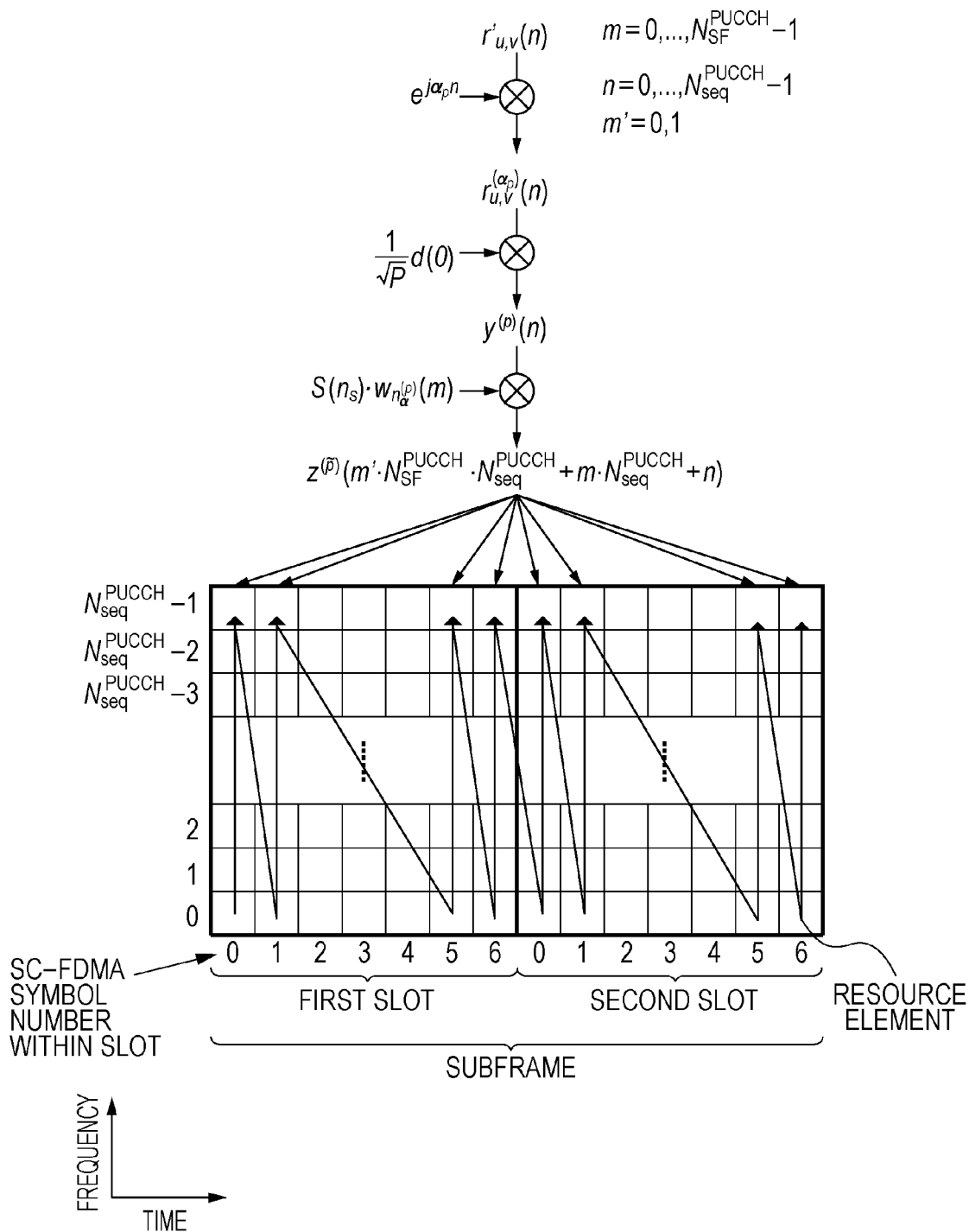
FIG. 10 is a diagram illustrating a method of generating the PUCCH according to the present embodiment.

FIG. 10 is a diagram illustrating a method of generating the PUCCH according to the present embodiment. In FIG. 10, $N^{PUCCH}_{SF}$ is a spreading factor of the orthogonal sequence w(i) within a single slot, and is 4. In FIG. 10, $N^{PUCCH}_{seq}$ is the number of subcarriers that are included in a bandwidth of a single PUCCH, and is 12. In FIG. 10, p is an antenna port number, and p is the number of antenna ports that are used the transmission of the PUCCH.

First, the mobile station 1 determines a sequence $r'_{u,v}(n)$. u is a sequence group number. In a case where a value of the virtual cell identity for the PUCCH is received, the mobile station 1 determines a value of u based on at least the virtual cell identity. Furthermore, in a case where the value of the virtual cell identity for the PUCCH is not received, the mobile station 1 determines the value of u based on at least the physical layer cell identity. v is a sequence number, and is always 0 for the PUCCH.

The base station 3 determines the value of the virtual cell identity for the PUCCH for each of the mobile stations 1, and may transmit information indicating the determined value of the virtual cell identity to each of the mobile stations 1. Moreover, the base station 3 may not transmit the information indicating the value of the value of the virtual cell identity for the PUCCH to the mobile station 1. The mobile station 1 sets the value of the virtual cell identity for the PUCCH based on the information (the signaling) indicating the value of the virtual cell identity for the PUCCH.

Moreover, the virtual cell identity may be set for each of the physical channel and physical signal. Moreover, multiple virtual cell identities may be set for a certain physical channel or a certain physical signal. Therefore, according to the present embodiment, the virtual cell identity for the PUCCH is simply referred to as the virtual cell identity.

Moreover, the sequence group number u may hop for every slot based on a pseudorandom sequence. The base station 3 transmits information indicating whether or not hopping for the sequence group number u is enabled. Furthermore, the mobile station 1 determines whether or not the sequence group number u is caused to hop based on the information indicating whether or not hopping for the sequence group number u is enabled.

The mobile station 1 and the base station 3 store the sequence $r'_{u,v}(n)$ of a sequence length 12 that is defined for each of the sequence numbers, and read (generate) the sequence $r'_{u,v}(n)$ that corresponds to the determined u.

The mobile station 1 generates a sequence $r^{(\alpha p)}_{u,v}(n)$ by multiplying the sequence $r'_{u,v}(n)$ by $e^{j\alpha pn}$. $a_p$ is an amount of phase rotation for every carrier. Phase rotation of the sequence $r'_{u,v}(n)$ in the frequency domain is equivalent to a cyclic shift of SC-FDMA symbol on the PUCCH in the time domain. Therefore, according to the present embodiment, $\alpha_p$ is also referred to as the cyclic shift.

The mobile station 1 generates a block $y^{(p)}(n)$ of the modulation symbols by multiplying a sequence $r^{(\alpha p)}_{u,v}(n)$ by $1/\sqrt{P}$ and $d(0)$. $d(0)$ is a modulation symbol that is generated by performing Binary Phase Shift Keying (BPSK) modulation or Quadrature Phase Shift Keying (QPSK) modulation on each of the one-bit or two-bit HARQ-ACK's.

The mobile station 1 multiplies a block $y^{(p)}(n)$ of the modulation symbol by $S(n_s)$, and spreads the block $y^{(p)}(n)$ multiplied by $S(n_s)$ with an orthogonal sequence $w_{n(p)OC}(m)$, thereby generating a block $z^{(p)}(*)$ of the modulation symbols. For $S(n_s)$, 1 or $e^{j\pi/2}$ is selected based on a PUCCH resource number.

Within the subframe, the mobile station 1 arranges the block $z^{(p)}(*)$ of the modulation symbol in the SC-FDMA symbols in {0, 1, 5, 6} of the first slot and next in the SC-FDMA symbols in {0, 1, 5, 6} of the second slot. Moreover, $z^{(p)}(*)$ is sequentially arranged in a single SC-FDMA symbol, starting from a subcarrier number having a small number.

A method of generating the DMRS will be described below.

Figure 11:
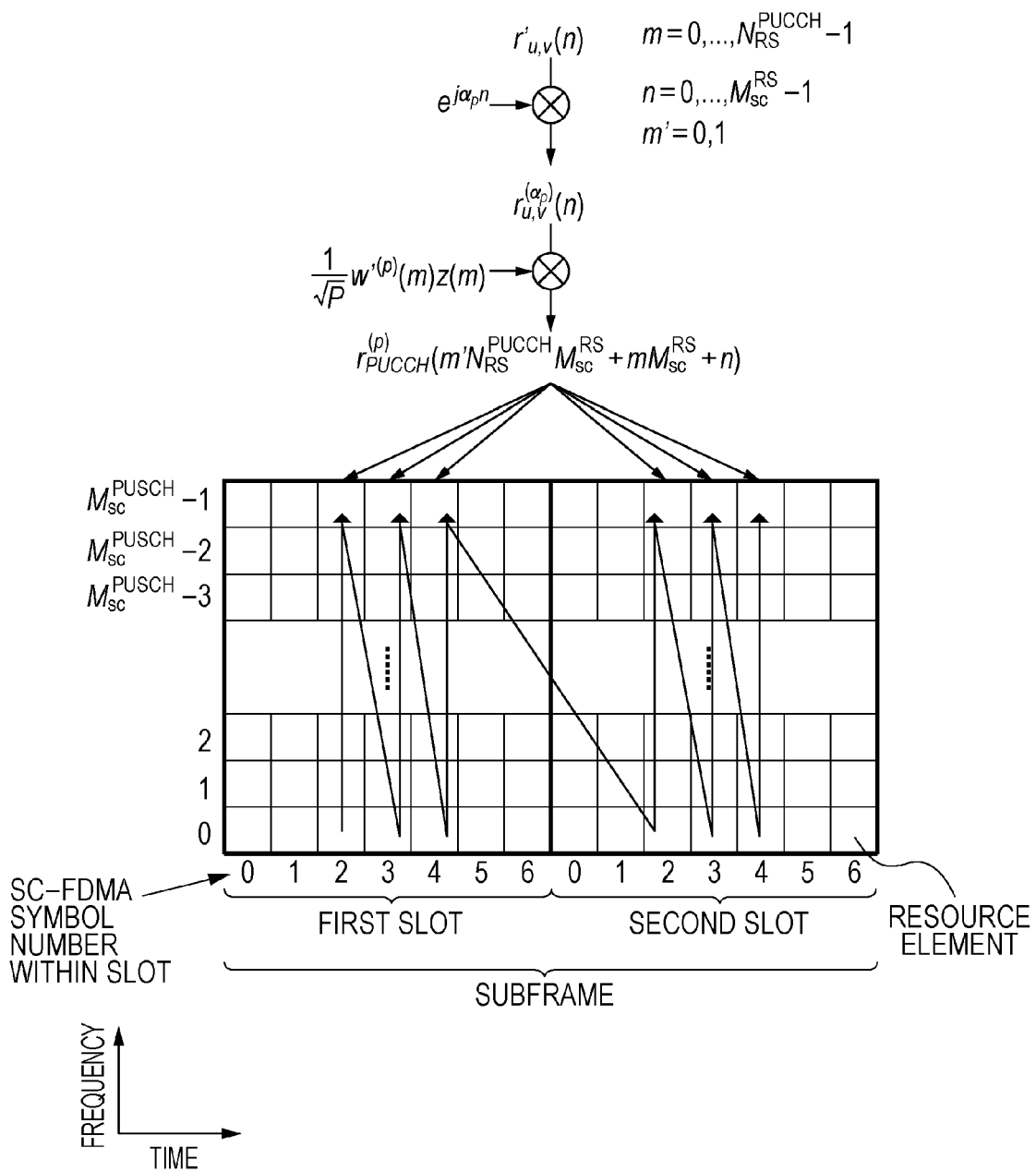
FIG. 11 is a diagram illustrating a method of generating a DMRS sequence according to the present embodiment.

FIG. 11 is a diagram illustrating the method of generating a DMRS sequence according to the present embodiment. In FIG. 11, $N^{PUCCH}_{RS}$ is the number of SC-FDMA symbols that are used in transmission of the DMRS for the PUCCH for every single slot, and is 3. In FIG. 11, $M^{RS}_{SC}$ is a length of a reference signal sequence and is 12.

In FIG. 11, the mobile station 1 generates the sequence $r^{(\alpha p)}_{u,v}(n)$ in the same manner as for the PUCCH. To be more precise, the mobile station 1 generates the sequence $r^{(\alpha p)}_{u,v}(n)$ based on at least the physical layer cell identity in a case where the virtual cell identity is not received, and generates the sequence $r^{(\alpha p)}_{u,v}(n)$ based on at least the virtual cell identity in a case where the virtual cell identity is received.

Furthermore, the mobile station 1 generates a sequence $r^{(p)}_{PUCCH}(*)$ by multiplying the sequence $r^{(\alpha p)}_{u,v}(n)$ by $1/\sqrt{P}$, $w'^{(p)}(m)$ and $z(m)$. $w'^{(p)}(m)$ is an orthogonal sequence for the DMRS. $z(m)$ is always 1 for the DMRS for the PUCCH that is used for transmission of only the HARQ-ACK. To be more precise, in a case where the DMRS for the PUCCH that is used for the transmission of the HARQ-ACK, the multiplication by $z(m)$ may not be performed.

Within the subframe, the mobile station 1 arranges the sequence $r^{(p)}_{PUCCH}(*)$ in the SC-FDMA symbols in {2, 3, 4} of the first slot and next in {2, 3, 4} of the second slot. Moreover, in a single SC-FDMA symbol, $r^{(p)}_{PUCCH}(*)$ is sequentially arranged, starting from a subframe having a small number.

Moreover, in the DMRS corresponding to a single PUCCH resource, $w'(i)$ corresponds to one of [1 1 1], [1 $e^{j2\pi/3}e^{j4\pi/3}$], and [1 $e^{j4\pi/3}$ $e^{j2\pi/3}$].

A first embodiment of the present invention will be described.

A correspondence between the CCE and the eCCE, and the PUCCH resource will be described.

According to the present embodiment, based on $n_{CCE}$ or $n_{eCCE}$, the mobile station 1 determines the PUCCH resource that is used in the transmission of the HARQ-ACK to the transport block that is received on the PDSCH.

$n_{CCE}$ is a number of the first CCE that is used for transmission of the downlink control information that is used in the scheduling of the PDSCH. That is, $n_{CCE}$ is the lowest CCE index, which is used to construct the PDCCH that is used for the transmission of the downlink control information that is used in the scheduling of the PDSCH. For example, in a case where CCE 2 and CCE 3 are used for the transmission of the downlink control information that is used in the scheduling of the PDSCH, $n_{CCE}$ is 2.

$n_{eCCE}$ is the first eCCE number that is used for the transmission of the downlink control information that is used in the scheduling of the PDSCH. That is, $n_{eCCE}$ is the lowest eCCE index, which is used to construct the ePDCCH that is used for the transmission of the downlink control information that is used in the scheduling of the PDSCH. For example, in a case where eCCE 2 and eCCE 3 are used for the transmission of the downlink control information that is used in the scheduling of the PDSCH, $n_{eCCE}$ is 2.

However, when the mobile station 1 determines the PUCCH resource based on a CCE or eCCE number, and a share parameter, the multiple mobile stations 1 that receive the downlink control information in each of the CCE and the eCCE that have the same number select the PUCCH resource having the same number, thereby causing a PUCCH signal to encounter a conflict.

Furthermore, the mobile station 1 that receives the virtual cell identity and the mobile station 1 that does not receive the virtual cell identity select the PUCCH resource that is arranged in the same resource block, but the PUCCH and the DMRS that are generated based on the virtual cell identity, and the PUCCH and the DMRS that are generated based on the physical resource block are not orthogonal to each other. Because of this, there is a problem that the PUCCH signals interfere with each other. Thus, according to the first embodiment, the problem described above is solved with the following method.

In a case where the downlink control information that is used for the scheduling of the PDSCH is received on the PDCCH, the mobile station 1 that does not receive the value of the virtual cell identity for the PUCCH determines the PUCCH resource for an antenna port $p_0$ based on Math. (1), and determines the PUCCH resource for an antenna port $p_1$ based on Math. (2). $N^{(1)}_{PUCCH}$ (a first value) is common among the multiple mobile stations 1. The base station 3 broadcasts a system information block that includes information indicating $N^{(1)}_{PUCCH}$ (the first value).

$$n_{PUCCH}^{(1,p0)} = n_{CCE} + N_{PUCCH}^{(1)} \qquad [\text{Math. 1}]$$

$$n_{PUCCH}^{(1,p1)} = n_{CCE} + N_{PUCCH}^{(1)} + 1 \qquad [\text{Math. 2}]$$

In the case where the downlink control information that is used for the scheduling of the PDSCH is received on the PDCCH, the mobile station 1 that receives the value of the virtual cell identity for the PUCCH determines the PUCCH resource for the antenna port $p_0$ based on Math. (3), and determines the PUCCH resource for the antenna port $p_1$ based on Math. (4). $N^{(1)}_{PUCCH\_CoMP}$ (a second value) is dedicated to the mobile station 1. The base station 3 transmits to the mobile station 1 a higher layer signal including information indicating $N^{(1)}_{PUCCH\_CoMP}$ (the second value).

$$n_{PUCCH}^{(1,p0)} = n_{CCE} + N_{PUCCH\_CoMP}^{(1)} \quad \text{[Math. 3]}$$

$$n_{PUCCH}^{(1,p1)} = n_{CCE} + N_{PUCCH\_CoMP}^{(1)} + 1 \quad \text{[Math. 4]}$$

In a case where the downlink control information that is used in the scheduling of the PDSCH is received on the ePDCCH, the mobile station 1 that does not receive the value of the virtual cell identity for the PUCCH determines the PUCCH resource for an antenna port $p_0$ based on Math. (5), and determines the PUCCH resource for an antenna port $p_1$ based on Math. (6).

$N^{(1)}_{ePDCCH(i)}$ (a third value) is dedicated to the mobile station 1, and is set for each ePDCCH set i. The base station 3 transmits to the mobile station 1 the higher layer signal that includes information indicating $N^{(1)}_{ePDCCH(i)}$ (the third value). In Math. (5) and Math. (6), the mobile station 1 uses $N^{(1)}_{ePDCCH(i)}$ (the third value) that corresponds to an ePDCCH set i where the ePDCCH is received (detected).

$$n_{PUCCH}^{(1,p0)} = n_{eCCE} + N_{PUCCH}^{(1)} + N_{ePDCCH(i)}^{(1)} \quad \text{[Math. 5]}$$

$$n_{PUCCH}^{(1,p1)} = n_{eCCE} + N_{PUCCH}^{(1)} + N_{ePDCCH(i)}^{(1)} + 1 \quad \text{[Math. 6]}$$

In the case where the downlink control information that is used in the scheduling of the PDSCH is received on the ePDCCH, the mobile station 1 that receives the value of the virtual cell identity for the PUCCH determines the PUCCH resource for the antenna port $p_0$ based on Math. (7), and determines the PUCCH resource for the antenna port $p_1$ based on Math. (8).

$$n_{PUCCH}^{(1,p0)} = n_{eCCE} + N_{PUCCH\_CoMP}^{(1)} + N_{ePDCCH(i)}^{(1)} \quad \text{[Math. 7]}$$

$$n_{PUCCH}^{(1,p1)} = n_{eCCE} + N_{PUCCH\_CoMP}^{(1)} + N_{ePDCCH(i)}^{(1)} + 1 \quad \text{[Math. 8]}$$

The mobile station 1 determines the PUCCH resource for the antenna port $p_0$, or the antenna ports $p_0$ and $p_1$ using one or more of Math. (1) to Math. (8), and transmits the HARQ-ACK on the determined PUCCH resource.

Furthermore, the base station 3 determines the PUCCH resource for the antenna port $p_0$, or the antenna ports $p_0$ and $p_1$ using one or more of Math. (1) to Math. (8), and receives the HARQ-ACK on the determined PUCCH resource.

Figure 12:
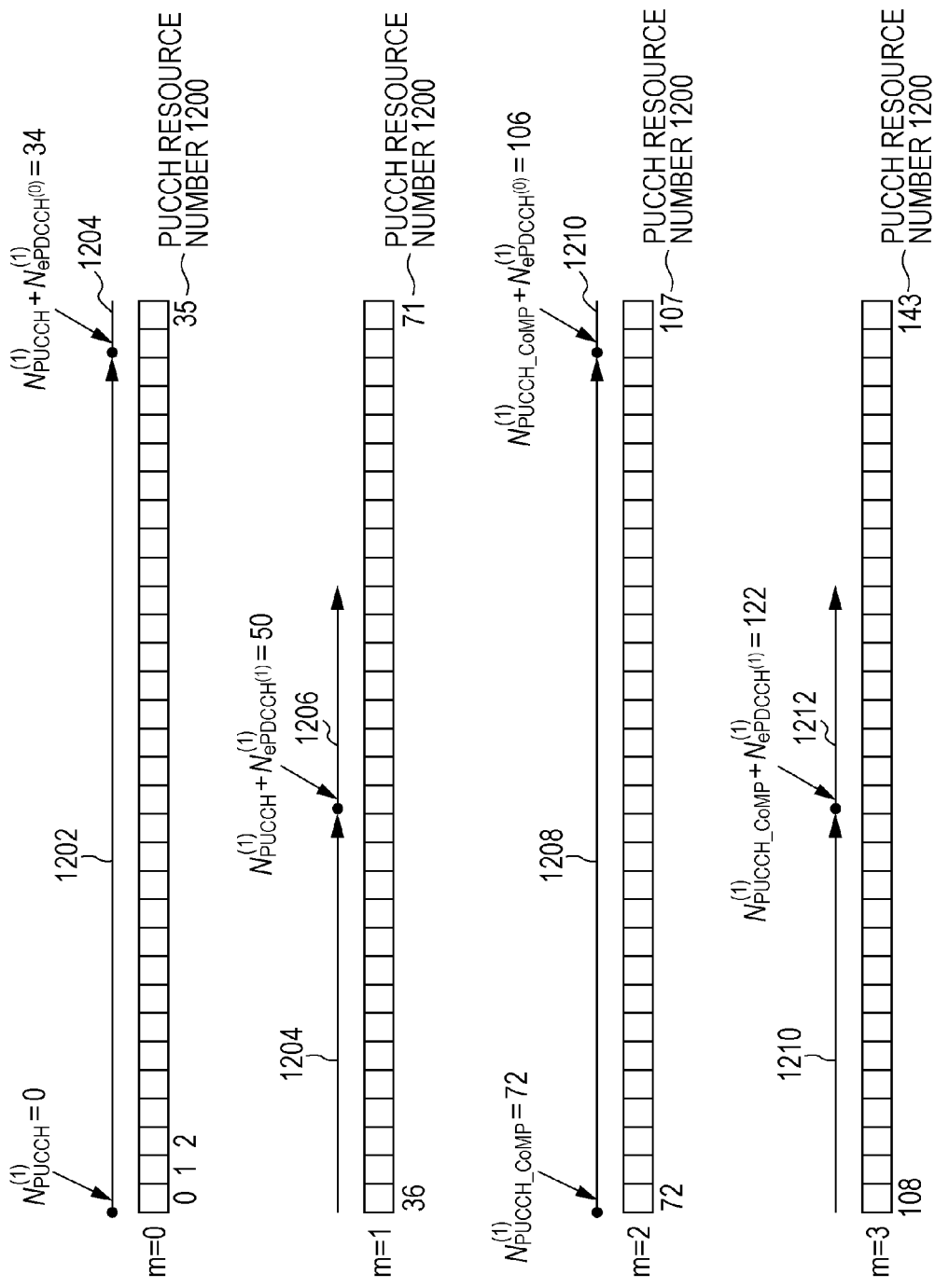
FIG. 12 is a diagram illustrating a correspondence between a PUCCH resource and a CCE/eCCE for an antenna port $p_0$ according to a first embodiment.

FIG. 12 is a diagram illustrating a correspondence between the PUCCH resource and the CCE/eCCE for the antenna port $p_0$ according to the first embodiment. In FIG. 12, m is a number for identifying the physical resource block in the PUCCH resource. In FIG. 12, a code 1200 indicates the PUCCH resource number.

In FIG. 12, it is assumed that the base station 3 can transmit up to 35 CCE's, up to 16 eCCE's for an ePDCCH set 1, and up to 8 eCCE's for an ePDCCH set 2. Furthermore, in FIG. 12, $N^{(1)}_{PUCCH}$ (the first value) is 0, $N^{(1)}_{PUCCH\_CoMP}$ (the second value) is 72, $N^{(1)}_{ePDCCH(1)}$ (the third value) corresponding to the ePDCCH set 1 is 34, and $N^{(1)}_{ePDCCH(2)}$ (the third value) corresponding to the ePDCCH set 2 is 50.

In FIG. 12, in a case where the mobile station 1 does not receive the value of the virtual cell identity and the downlink control information that is used for the scheduling of the PDSCH is received on the PDCCH, a code 1202 indicates the PUCCH resource that has the likelihood of being used by the mobile station 1 in the transmission of the HARQ-ACK. To be more precise, the code 1202 is a range of the PUCCH resource number that is output by Math. (1) in FIG. 12.

In FIG. 12, in a case where the mobile station 1 does not receive the value of the virtual cell identity and the downlink control information that is used for the scheduling of the PDSCH is received on the ePDCCH in the ePDCCH set 1, a code 1204 indicates the PUCCH resource that has the likelihood of being used by the mobile station 1 in the transmission of the HARQ-ACK.

In FIG. 12, in a case where the mobile station 1 does not receive the value of the virtual cell identity and the downlink control information that is used for the scheduling of the PDSCH is received on the ePDCCH in the ePDCCH set 2, a code 1206 indicates the PUCCH resource that has the likelihood of being used by the mobile station 1 in the transmission of the HARQ-ACK. To be more precise, the code 1204 and the 1206 are ranges of the PUCCH resource number that is output by Math. (5) in FIG. 12.

In FIG. 12, in a case where the mobile station 1 receives the value of the virtual cell identity and the downlink control information that is used for the scheduling of the PDSCH is received on the PDCCH, a code 1208 indicates the PUCCH resource that has the likelihood of being used by the mobile station 1 in the transmission of the HARQ-ACK. To be more precise, the code 1208 is a range of the PUCCH resource number that is output by Math. (3) in FIG. 12.

In FIG. 12, in the case where the mobile station 1 receives the value of the virtual cell identity and the downlink control information that is used for the scheduling of the PDSCH is received on the ePDCCH in the ePDCCH set 1, a code 1210 indicates the PUCCH resource that has the likelihood of being used by the mobile station 1 in the transmission of the HARQ-ACK.

In FIG. 12, in a case where the mobile station 1 receives the value of the virtual cell identity and the downlink control information that is used for the scheduling of the PDSCH is received on the ePDCCH in the ePDCCH set 2, a code 1212 indicates the PUCCH resource that has the likelihood of being used by the mobile station 1 in the transmission of the HARQ-ACK. To be more precise, the code 1210 and the 1212 are ranges of the PUCCH resource number that is output by Math. (7) in FIG. 12.

As a result, in FIG. 12, the mobile station 1 that does not receive the value of the virtual cell identity transmits the HARQ-ACK on the PUCCH resource in which m corresponds to 0 or 1, and that mobile station 1 that receives the value of the virtual cell identity transmits the HARQ-ACK on the PUCCH resource in which m corresponds to 1 or 2. To be more precise, because each of the mobile stations 1 that does not receive the value of the virtual cell identity and the mobile station 1 that receives the value of the virtual cell identity transmit the PUCCH on different physical resource blocks, interference of the PUCCH signals with each other can be avoided. Furthermore, because the same indexes of the CCE and the eCCE for a PDCCH set i correspond to the PUCCH resources that have different indexes, conflict between the PUCCH resources can be avoided.

Operation of each of the mobile station 1 and the base station 3 according to the first embodiment will be described referring to flowcharts.

Figure 13:
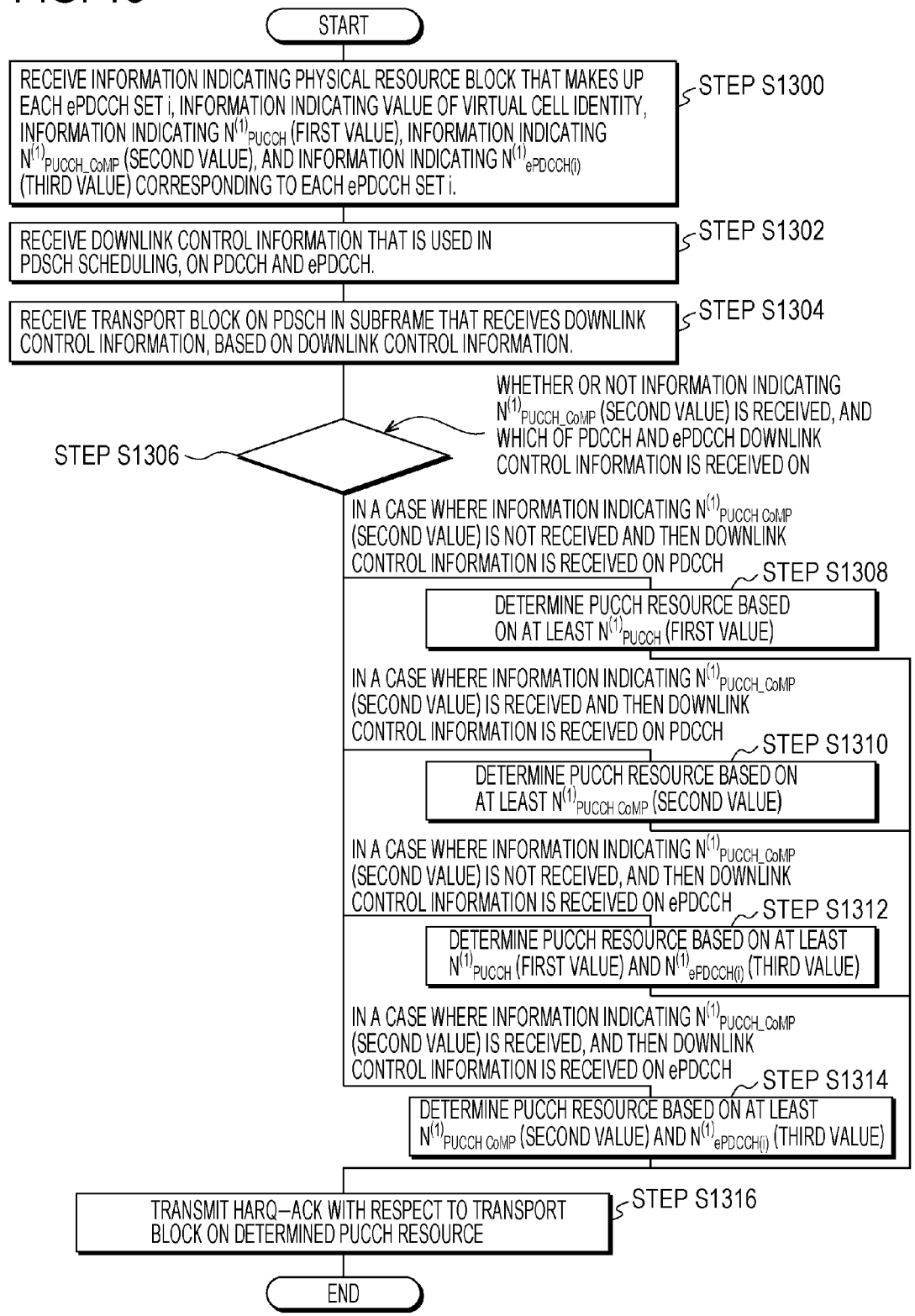
FIG. 13 is a flowchart for describing operation of a mobile station 1 according to the first embodiment.

FIG. 13 is a flowchart for describing the operation of the mobile station 1 according to the first embodiment. The mobile station 1 receives the information indicating the physical resource block that constructs each ePDCCH set i, the information indicating the value of the virtual cell identity, the information indicating $N^{(1)}_{PUCCH}$ (the first value), the information indicating $N^{(1)}_{PUCCH\_CoMP}$ (the second value), and the information indicating $N^{(1)}_{ePDCCH(i)}$ (the third value) corresponding to each ePDCCH set i (Step S1300). Moreover, in Step S1300, the mobile station 1 may not receive one or more of, or all of the information indicating the physical resource block that constructs each ePDCCH set i, the information indicating the value of the virtual cell identity, the information indicating $N^{(1)}_{PUCCH\_CoMP}$ (the second value), and the information indicating $N^{(1)}_{ePDCCH(i)}$ (the third value) corresponding to each ePDCCH set i.

Moreover, the information indicating $N^{(1)}_{ePDCCH(i)}$ (the third value) corresponding to the PDCCH set i is transmitted and received together with the information indicating the physical resource block that constructs the ePDCCH set i. Furthermore, the information indicating $N^{(1)}_{PUCCH\_CoMP}$ (the second value) is transmitted and received together with the information indicating the value of the virtual cell identity.

Hereinafter, the mobile station 1 that does not receive the value of the virtual cell identity and $N^{(1)}_{PUCCH\_CoMP}$ (the second value) is simply also referred to as the mobile station 1 that does not just receive $N^{(1)}_{PUCCH\_CoMP}$ (the second value) or as the mobile station 1 that does not receive the value of the virtual cell identity. Hereinafter, the base station 3 that does not receive the value of the virtual cell identity and $N^{(1)}_{PUCCH\_CoMP}$ (the second value) is simply referred to as the base station 3 that does not transmit $N^{(1)}_{PUCCH\_CoMP}$ (the second value), or as the base station 3 that does not transmit the value of the virtual cell identity.

Furthermore, the transmission and reception of the information indicating $N^{(1)}_{PUCCH\_CoMP}$ (the second value) and the information indicating the value of the virtual cell identity, which are taken together, is expressed as the transmission and reception of the information indicating $N^{(1)}_{PUCCH\_CoMP}$ (the second value), or as the transmission and reception of the information indicating the value of the virtual cell identity.

The mobile station 1 receives the downlink control information that is used in the scheduling of the PDSCH on the PDCCH and on the ePDCCH (Step S1302). Based on the downlink control information, the mobile station 1 receives the transport block on the PDSCH in the subframe in which the downlink control information is received (Step S1304). The mobile station 1 determines whether or not the information indicating $N^{(1)}_{PUCCH\_CoMP}$ (the second value) is received, and which of the PDCCH and the ePDCCH the downlink control information is received on (Step S1306).

In a case where the information indicating $N^{(1)}_{PUCCH\_CoMP}$ (the second value) is not received and the downlink control information is received on the PDCCH, the mobile station 1 determines the PUCCH resource based on at least $N^{(1)}_{PUCCH}$ (the first value) (Step S1308).

In a case where the information indicating $N^{(1)}_{PUCCH\_CoMP}$ (the second value) is received and the downlink control information is received on the PDCCH, the mobile station 1 determines the PUCCH resource based on at least $N^{(1)}_{PUCCH\_CoMP}$ (the second value) (Step S1310).

In a case where the information indicating $N^{(1)}_{PUCCH\_CoMP}$ (the second value) is not received and the downlink control information is received on the ePDCCH, the mobile station 1 determines the PUCCH resource based on at least $N^{(1)}_{PUCCH}$ (the first value) and on $N^{(1)}_{ePDCCH(i)}$ (the third value) that corresponds to the ePDCCH set i that receives the ePDCCH (Step S1312).

In a case where the information indicating $N^{(1)}_{PUCCH\_CoMP}$ (the second value) is received and the downlink control information is received on the ePDCCH, the mobile station 1 determines the PUCCH resource based on at least $N^{(1)}_{PUCCH\_CoMP}$ (the second value) and on $N^{(1)}_{ePDCCH(i)}$ (the third value) that corresponds to the ePDCCH set i that receives the ePDCCH (Step S1314).

The mobile station 1 transmits the HARQ-ACK to the transport block, on the determined PUCCH resource (Step S1316).

Figure 14:
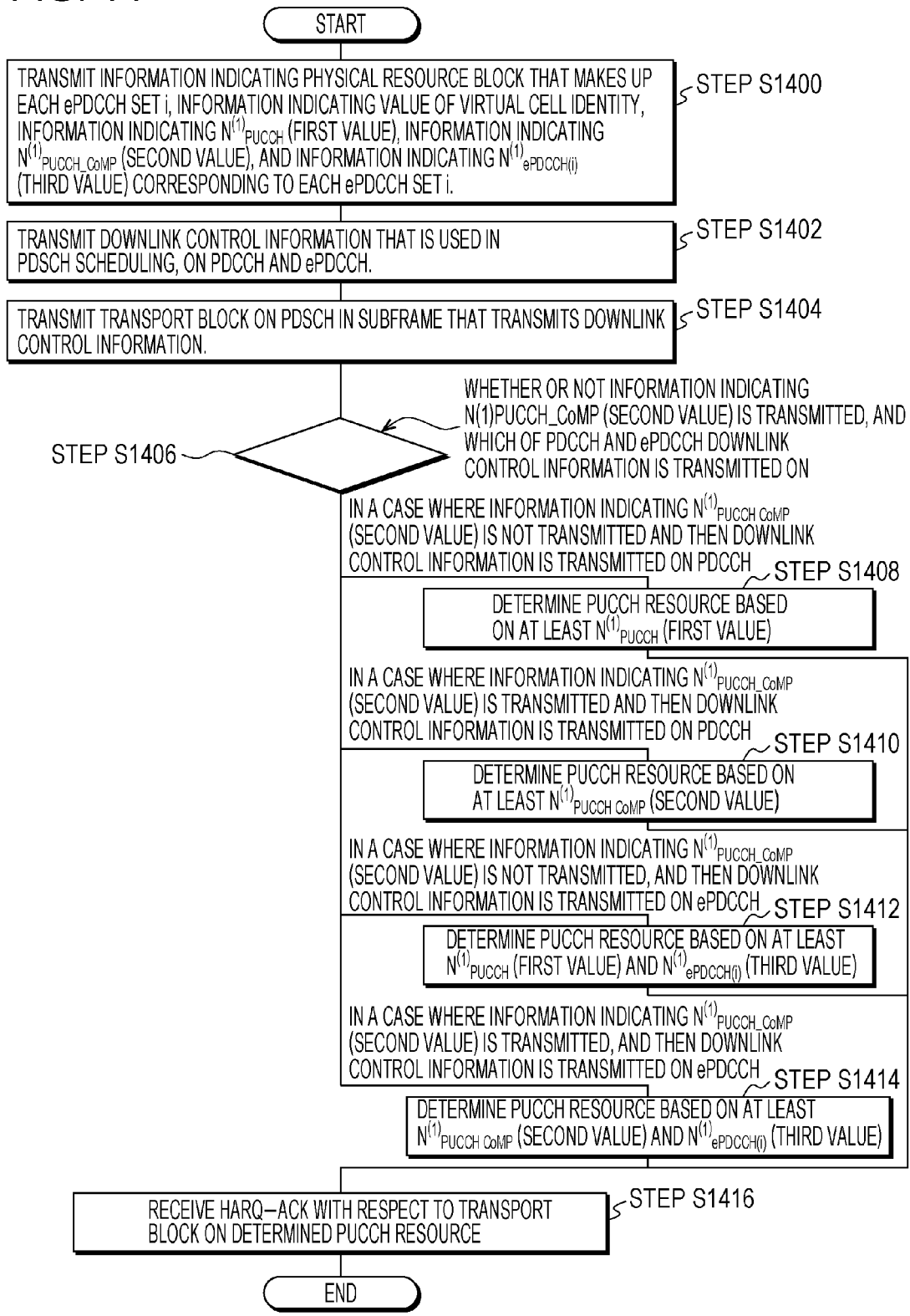
FIG. 14 is a flowchart for describing operation of a base station 3 according to the first embodiment.

FIG. 14 is a flowchart for describing the operation of the base station 3 according to the first embodiment. The base station 3 transmits to the mobile station 1 the information indicating the physical resource block that constructs each ePDCCH set i, the information indicating the value of the virtual cell identity, the information indicating $N^{(1)}_{PUCCH}$ (the first value), the information indicating $N^{(1)}_{PUCCH\_CoMP}$ (the second value), and the information indicating $N^{(1)}_{ePDCCH(i)}$ (the third value) corresponding to each ePDCCH set i (Step S1400). Moreover, in Step S1400, the base station 3 may not transmit to the base mobile station 1 one or more of, or all of the information indicating the physical resource block that constructs each ePDCCH set i, the information indicating the value of the virtual cell identity, the information indicating $N^{(1)}_{PUCCH\_CoMP}$ (the second value), and the information indicating $N^{(1)}_{ePDCCH(i)}$ (the third value) corresponding to each ePDCCH set i.

The base station 3 transmits to the mobile station 1 the downlink control information that is used in the scheduling of the PDSCH on the PDCCH and on the ePDCCH (Step S1402). The base station 3 transmits to the mobile station 1 the transport block on the PDSCH in the subframe in which the downlink control information is transmitted (Step S1404). The base station 3 determines whether or not the information indicating $N^{(1)}_{PUCCH\_CoMP}$ (the second value) is transmitted, and which of the PDCCH and the ePDCCH the downlink control information is transmitted on (Step S1406).

In a case where the information indicating $N^{(1)}_{PUCCH\_CoMP}$ (the second value) is not transmitted and the downlink control information is transmitted on the PDCCH, the base station 3 determines the PUCCH resource based on at least $N^{(1)}_{PUCCH}$ (the first value) (Step S1408).

In a case where the information indicating $N^{(1)}_{PUCCH\_CoMP}$ (the second value) is transmitted and the downlink control information is transmitted on the PDCCH, the base station 3 determines the PUCCH resource based on at least $N^{(1)}_{PUCCH\_CoMP}$ (the second value) (Step S1410).

In a case where the information indicating $N^{(1)}_{PUCCH\_CoMP}$ (the second value) is not transmitted and the downlink control information is transmitted on the ePDCCH, the base station 3 determines the PUCCH resource based on at least $N^{(1)}_{PUCCH}$ (the first value) and on $N^{(1)}_{ePDCCH(i)}$ (the third value) that corresponds to the ePDCCH set i that transmits the ePDCCH (Step S1412).

In a case where the information indicating $N^{(1)}_{PUCCH\_CoMP}$ (the second value) is transmitted and the downlink control information is transmitted on the ePDCCH, the base station 3 determines the PUCCH resource based on at least $N^{(1)}_{PUCCH\_CoMP}$ (the second value) and on $N^{(1)}_{ePDCCH(i)}$ (the third value) that corresponds to the ePDCCH set i that transmits the ePDCCH (Step S1414).

The base station 3 receives the HARQ-ACK to the transport block, on the determined PUCCH resource (Step S1416).

A device configuration according to the first embodiment will be described below.

Figure 15:
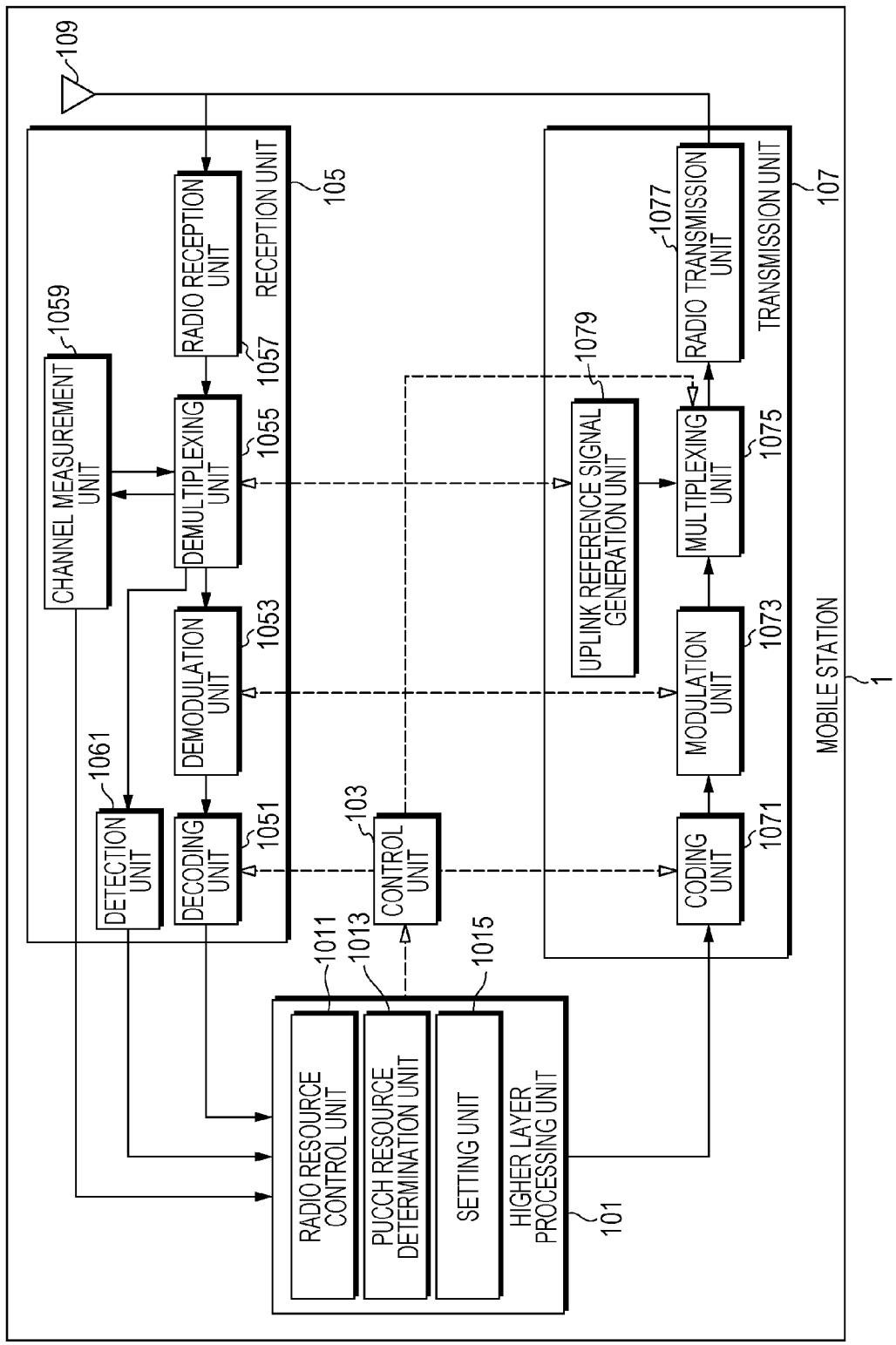
FIG. 15 is a schematic block diagram illustrating a configuration of the mobile station 1 according to the present embodiment.

FIG. 15 is a schematic block diagram illustrating a configuration of the mobile station 1 according to the present embodiment. As illustrated, the mobile station 1 is configured to include a higher layer processing unit 101, a control unit 103, a reception unit 105, a transmission unit 107, and a transmit and receive antenna 109. Furthermore, the higher layer processing unit 101 is configured to include a radio resource control unit 1011, a PUCCH resource determination unit 1013, and a setting unit 1015. Furthermore, the reception unit 105 is configured to include a decoding unit 1051, a demodulation unit 1053, a demultiplexing unit 1055, a radio reception unit 1057, a channel measurement unit 1059, and a detection unit 1061. Furthermore, the transmission unit 107 is configured to include a coding unit 1071, a modulation unit 1073, a multiplexing unit 1075, a radio transmission unit 1077, and an uplink reference signal generation unit 1079.

The higher layer processing unit 101 outputs the uplink data (the transport block) generated by a user operation and the like, to the transmission unit 107. Furthermore, the higher layer processing unit 101 performs processing of a Medium Access Control (MAC) layer, a Packet Data Convergence Protocol (PDCP) layer, a Radio Link Control (RLC) layer, and a Radio Resource Control (RRC) layer. Furthermore, the radio resource control unit 1011 generates information that is arranged in each channel for uplink, and outputs the generated information to the transmission unit 107.

The PUCCH resource determination unit 1013 that is included in the higher layer processing unit 101 determines the PUCCH resource that is used to transmit the Uplink Control Information.

The setting unit 1015 that is included in the higher layer processing unit 101 manages various pieces of setting information of the mobile station 1 itself. For example, the setting unit 1015 performs various settings according to the signaling received from the base station 3.

The control unit 103 generates a control signal for performing control of the reception unit 105 and of the transmission unit 107, based on control information from the higher layer processing unit 101. The control unit 103 outputs the generated control signal to the reception unit 105 and the transmission unit 107, and performs control of the reception unit 105 and the transmission unit 107.

In accordance with a control signal that is input from the control unit 103, the reception unit 105 demultiplexes, demodulates, and decodes a received signal that is received from the base station 3 through the transmit and receive antenna 109, and outputs the resulting information to the higher layer processing unit 101.

The radio reception unit 1057 converts (down-converts) a downlink signal received through the transmit and receive antenna 109 into an intermediate frequency, removes unnecessary frequency components, controls an amplification level in such a manner as to suitably maintain a signal level, performs orthogonal demodulation based on an in-phase component and an orthogonal component of the received signal, and converts the resulting orthogonally-demodulated analog signal into a digital signal. The radio reception unit 1057 removes a portion equivalent to a guard interval (GI) from the digital signal that results from the conversion, performs Fast Fourier Transform (FFT) on the signal from which the guard interval is removed, and extracts a signal in the frequency domain.

The demultiplexing unit 1055 demultiplexes the extracted signal into the PHICH, the PDCCH, the ePDCCH, the PDSCH, and the downlink reference signal. Furthermore, the demultiplexing unit 1055 makes an adjustment of channels, the PHICH, the PDCCH, the ePDCCH, and the PDSCH, from a channel estimate being input from the channel measurement unit 1059. Furthermore, the demultiplexing unit 1055 outputs the demultiplexed downlink reference signal that results from the demultiplexing to the channel measurement unit 1059.

The demodulation unit 1053 multiplies the PHICH by a corresponding code for composition, performs demodulation in compliance with the Binary Phase Shift Keying (BPSK) modulation scheme on the resulting composite signal, and outputs a result of the demodulation to the decoding unit 1051. The decoding unit 1051 decodes the PHICH destined for the mobile station 1 itself, and outputs the HARQ indicator that results from the decoding to the higher layer processing unit 101.

The demodulation unit 1053 performs the demodulation on the PDSCH in compliance with the modulation scheme notified with the downlink grant, such as Quadrature Phase Shift Keying (QPSK), 16 Quadrature Amplitude Modulation (QAM), or 64 QAM, and outputs a result of the demodulation to the decoding unit 1051. The decoding unit 1051 performs the decoding based on information relating to a coding rate that is notified with the downlink control information, and outputs the downlink data (the transport block) that results from the decoding to the higher layer processing unit 101.

The channel measurement unit 1059 measures a downlink path loss or a channel state from the downlink reference signal being input from the demultiplexing unit 1055, and outputs the measured path loss or channel state to the higher layer processing unit 101. Furthermore, the channel measurement unit 1059 calculates a downlink channel estimate from the downlink reference signal and outputs the calculated downlink channel estimate to the demultiplexing unit 1055.

The detection unit 1061 performs detection of the downlink control information with the PDCCH and/or the ePDCCH, and outputs the detected downlink control information to the higher layer processing unit 101. The detection unit 1061 performs demodulation in compliance with the QPSK modulation scheme and decoding on the PDCCH and/or the ePDCCH. The detection unit 1061 attempts to perform blind decoding of the PDCCH and/or the ePDCCH. In a case where the blind decoding succeeds, the detection unit 1061 outputs the downlink control information to the higher layer processing unit 101.

The transmission unit 107 generates the uplink reference signal in accordance with the control signal being input from the control unit 103, performs the coding and the modulation on the uplink data (the transport block) being input from the higher layer processing unit 101, multiplexes the PUCCH, the PUSCH, and the generated uplink reference signal, and transmits a result of the multiplexing to the base station 3 through the transmit and receive antenna 109.

The coding unit 1071 performs the coding, such as convolutional coding and block coding, on the uplink control information being input from the higher layer processing unit 101. Furthermore, the coding unit 1071 performs turbo coding, based on information that is used in the scheduling of the PUSCH.

The modulation unit 1073 performs the modulation on coded bits being input from the coding unit 1071, in compliance with the modulation scheme notified with the downlink control information, such as BPSK, QPSK, 16 QAM, or 64 QAM, or the modulation scheme that is prescribed in advance on every channel. Based on the information that is used in the scheduling of the PUSCH, the modulation unit 1073 determines the number of sequences of pieces of data that are space-multiplexed, maps multiple pieces of uplink data that are transmitted on the same PUSCH, to multiple sequences, by using Multiple Input Multiple Output Spatial Multiplexing (MIMO SM), and performs precoding on the sequences. The modulation unit 1073 spreads the PUCCH using the cyclic shift and/or the orthogonal sequence.

The uplink reference signal generation unit 1079 generates a reference signal sequence based on the physical layer cell identity (PCI) and the virtual cell identity for identifying the base station 3.

In accordance with the control signal that is input from the control unit 103, the multiplexing unit 1075 rearranges the modulation symbols on the PUSCH in parallel and then performs Discrete Fourier Transform (DFT) on the rearranged modulation symbols. Furthermore, the multiplexing unit 1075 multiplexes PUCCH and PUSCH signals and the generated uplink reference signal for each transmit antenna port. To be more precise, the multiplexing unit 1075 arranges the PUCCH and PUSCH signals and the generated uplink reference signal in the resource elements for each transmit antenna port.

The radio transmission unit 1077 performs Inverse Fast Fourier Transform (IFFT) on the multiplexed signal, performs the modulation in compliance with an SC-FDMA scheme, generates an SC-FDMA symbol, adds the guard interval to the SC-FDMA-modulated SC-FDMA symbol, generates a digital signal in a baseband, converts the digital signal in the baseband into an analog signal, generates an in-phase component and an orthogonal component in an intermediate frequency from the analog signal, removes frequency components unnecessary for an intermediate frequency band, converts (up-converts) the signal in the intermediate frequency into a high frequency signal, removes unnecessary frequency components, performs power amplification, and outputs a final result to the transmit and receive antenna 109 for transmission.

Figure 16:
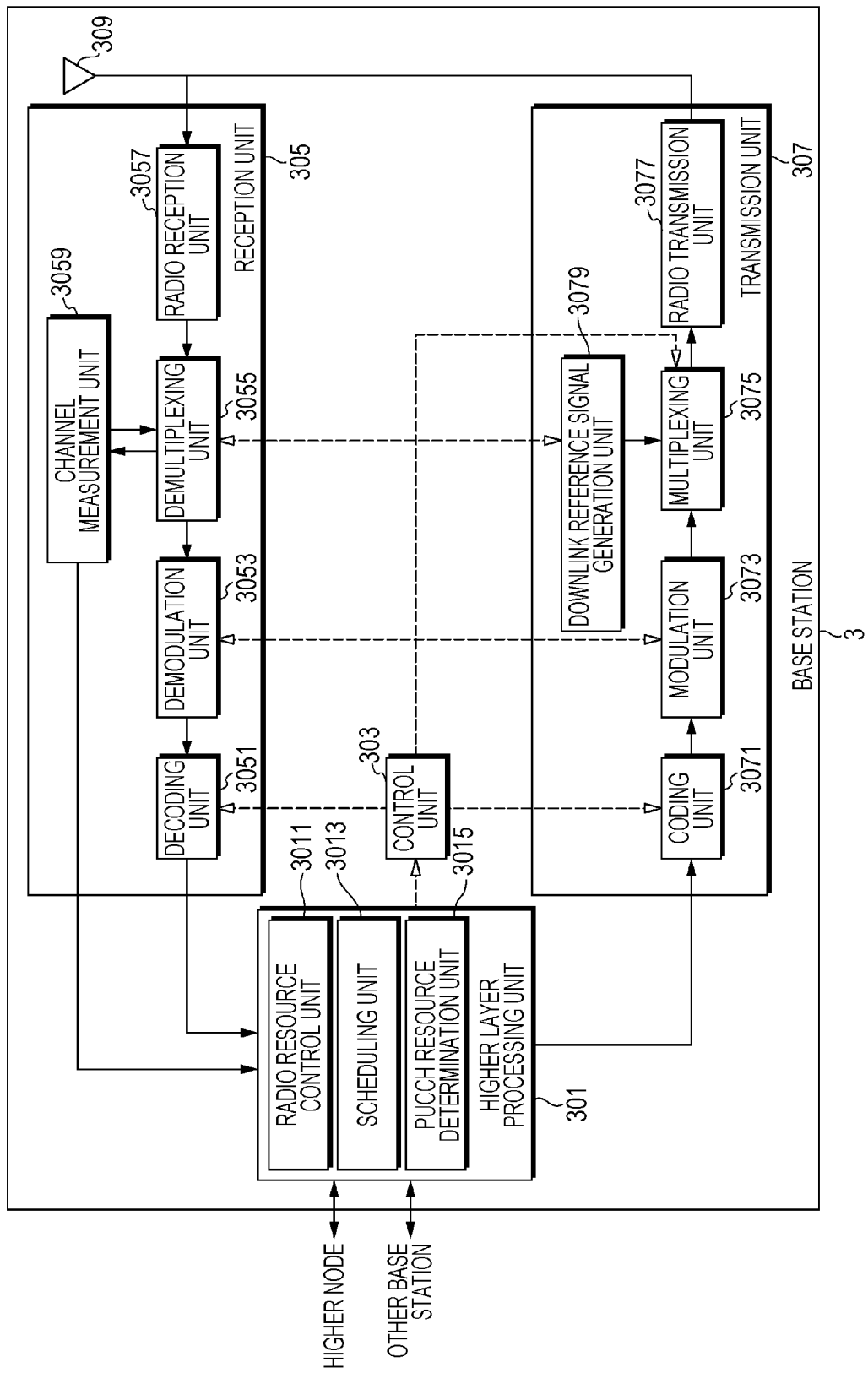
FIG. 16 is a schematic block diagram illustrating a configuration of the base station 3 according to the present embodiment.

FIG. 16 is a schematic block diagram illustrating a configuration of the base station 3 according to the present embodiment. As is illustrated, the base station 3 is configured to include a higher layer processing unit 301, a control unit 303, a reception unit 305, a transmission unit 307, and a transmit and receive antenna 309. Furthermore, the higher layer processing unit 301 is configured to include a radio resource control unit 3011, a scheduling unit 3013, and a PUCCH resource determination unit 3015. Furthermore, the reception unit 305 is configured to include a decoding unit 3051, a demodulation unit 3053, a demultiplexing unit 3055, a radio reception unit 3057, and a channel measurement unit 3059. Furthermore, the transmission unit 307 is configured to include a coding unit 3071, a modulation unit 3073, a multiplexing unit 3075, a radio transmission unit 3077, and a downlink reference signal generation unit 3079.

The higher layer processing unit 301 performs the processing of the Medium Access Control (MAC) layer, the Packet Data Convergence Protocol (PDCP) layer, the Radio Link Control (RLC) layer, and the Radio Resource Control (RRC) layer. Furthermore, the higher layer processing unit 301 generates a control signal for performing control of the reception unit 305 and of the transmission unit 307 and outputs the generated control information to the control unit 303.

The radio resource control unit 3011 that is included in the higher layer processing unit 301 generates, or acquires from a higher node, downlink data (a transport block) that is arranged in the downlink PDSCH, a system information block, an RRC signal, the MAC control element (CE), and the like, and outputs a result of the generation or of the acquirement to the transmission unit 307. Furthermore, the radio resource control unit 3011 manages various pieces of setting information on each of the mobile stations 1.

The scheduling unit 3013 that is included in the higher layer processing unit 301 determines a frequency and a subframe to which the physical channel (the PDSCH and the PUSCH) is allocated, the coding rate and modulation scheme of the physical channel (the PDSCH and the PUSCH), the transmission power, and the like, from a channel estimate, channel quality, or the like that is input from the channel measurement unit 3059. The scheduling unit 3013 generates the control information in order to perform the control of the reception unit 305 and of the transmission unit 307 based on a result of the scheduling, and outputs the generated information to the control unit 303. Furthermore, the scheduling unit 3013 outputs a result of the scheduling of the physical channel (the PDSCH and the PUSCH) to the control information generation unit 3015.

The PUCCH resource determination unit 3015 that is included in the higher layer processing unit 301 determines the PUCCH resource that is used to transmit the Uplink Control Information.

The control unit 303 generates a control signal for performing control of the reception unit 305 and of the transmission unit 307, based on control information from the higher layer processing unit 301. The control unit 303 outputs the generated control signal to the reception unit 305 and the transmission unit 307, and performs control of the reception unit 305 and the transmission unit 307.

In accordance with the control signal that is input from the control unit 303, the reception unit 305 demultiplexes, demodulates, and decodes a received signal that is received from the mobile station 1 through the transmit and receive antenna 309, and outputs the resulting information to the higher layer processing unit 301. The radio reception unit 3057 converts (down-converts) an uplink signal received through the transmit and receive antenna 309 into an intermediate frequency, removes unnecessary frequency components, controls an amplification level in such a manner as to suitably maintain a signal level, performs orthogonal demodulation based on an in-phase component and an orthogonal component of the received signal, and converts the resulting orthogonally-demodulated analog signal into a digital signal.

The radio reception unit 3057 removes a portion corresponding to the guard interval (GI) from the digital signal that results from the conversion. The radio reception unit 3057 performs Fast Fourier Transform (FFT) on the signal from which the guard interval is removed, and outputs the resulting signal to the demultiplexing unit 3055 that extracts the signal in the frequency domain.

The demultiplexing unit 3055 demultiplexes the signal being input from the radio reception unit 3057 into the PUCCH, the PUSCH, and the signal such as the uplink reference signal. Moreover, the demultiplexing is performed based on radio resource allocation information that is determined in advance in the radio resource control unit 3011 by the base station 3, and that is included in the uplink grant notified to each mobile station 1. Furthermore, the demultiplexing unit 3055 makes an adjustment of channels, the PUCCH and the PUSCH, from the channel estimate being input from the channel measurement unit 3059. Furthermore, the demultiplexing unit 3055 outputs the demultiplexed uplink reference signal to the channel measurement unit 3059.

The demodulation unit 3053 performs Inverse Discrete Fourier Transform (IDFT) on the PUSCH, acquires the modulation symbol, and performs the demodulation of the received signal with respect to each of the modulation symbols of the PUCCH and the PUSCH, using the modulation scheme prescribed in advance, such as Binary Phase Shift Keying (BPSK), QPSK, 16 QAM, or 64 QAM, or the modulation scheme that the base station 3 itself notifies, in advance with the uplink grant, to each of the mobile stations 1. The demodulation unit 3053 demultiplexes the modulation symbol of the multiple pieces of uplink data that are transmitted on the same PUSCH by using MIMO SM, based on the number of space-multiplexed sequences that is notified in advance with the uplink grant to each of the mobile stations 1 and on information indicating the precoding that is performed on the sequences.

The decoding unit 3051 performs the decoding on the demodulated coded bits of the PUCCH and the PUSCH at the coding rate in compliance with a coding scheme prescribed in advance, which is prescribed in advance, or is notified in advance with the uplink grant to the mobile station 1 by the base station 3 itself, and outputs the uplink data and the uplink control information that are decoded to the higher layer processing unit 101. In a case where the PUSCH is retransmitted, the decoding unit 3051 performs the decoding using the coded bits that are input from the higher layer processing unit 301 and that are retained in a HARQ buffer, and the demodulated coded bits. The channel measurement unit 3059 measures the channel estimate or the channel quality, and the like, based on the uplink reference signal being input from the demultiplexing unit 3055, and outputs a result of the measurement to the demultiplexing unit 3055 and the higher layer processing unit 301.

The transmission unit 307 generates the downlink reference signal in accordance with the control signal being input from the control unit 303, codes and modulates the HARQ indicator, the downlink control information, and the downlink data that are input from the higher layer processing unit 301, multiplexes the PHICH, the PDCCH, the ePDCCH, the PDSCH, and the downlink reference signal, and transmits a result of the multiplexing to the mobile station 1 through the transmit and receive antenna 309.

The coding unit 3071 performs the coding on the HARQ indicator, the downlink control information, and the downlink data that are input from the higher layer processing unit 301. When performing the coding, the coding unit 3071 uses a coding scheme that is prescribed in advance, such as block coding, convolutional coding, or turbo coding, or a coding scheme that is determined by the radio resource control unit 3011. The modulation unit 3073 performs the modulation on the coded bits being input from the coding unit 3071. When performing the modulation, the modulation unit 3073 uses the modulation scheme that is prescribed in advance, such as BPSK, QPSK, 16 QAM, or 64 QAM, or the modulation scheme that is determined by the radio resource control unit 3011.

The downlink reference signal generation unit 3079 generates as the downlink reference signal a sequence that is already known to the mobile station 1, which is acquired according to a predetermined rule that is determined in advance based on the physical cell identity (PCI) for identifying the base station 3, and the like. The multiplexing unit 3075 multiplexes the modulated modulation symbol of each channel and the generated downlink reference signal. To be more precise, the multiplexing unit 3075 arranges the modulated modulation symbol of each channel and the generated downlink reference signal in the resource elements.

The radio transmission unit 3077 performs Inverse Fast Fourier Transform (IFFT) on the multiplexed modulation symbol, performs the modulation in compliance with an OFDM scheme, generates an OFDM symbol, adds the guard interval to the OFDM-modulated OFDM symbol, generates a digital signal in a baseband, converts the digital signal in the baseband into an analog signal, generates an in-phase component and an orthogonal component in an intermediate frequency from the analog signal, removes frequency components unnecessary for an intermediate frequency band, converts (up-converts) the signal in the intermediate frequency into a high frequency signal, removes unnecessary frequency components, performs power amplification, and outputs a final result to the transmit and receive antenna 309 for transmission.

Described in detail below will be each operation of the reception unit 105, the detection unit 1061, the PUCCH resource determination unit 1013, the setting unit 1015, the transmission unit 107, and the uplink reference signal generation unit 1079 that construct the mobile station 1 according to the first embodiment.

The setting unit 1015 sets the value of the virtual cell identity, the first value, the second value, and the third value for the PUCCH, based on the signaling received from the base station. The detection unit 1061 detects the downlink control information that is used in the scheduling of the PDSCH, with the PDCCH or the ePDCCH. The reception unit 105 receives the transport block on the PDSCH.

In a case where the detection unit 1061 detects the downlink control information with the PDCCH, the PUCCH resource determination unit 1013 selects any of the first value and the second value depending on whether or not the value of the virtual cell identity for the PUCCH is set by the setting unit 1015, and determines the PUCCH resource based on at least the selected value.

Furthermore, in a case where the detection unit 1061 detects the downlink control information with the ePDCCH, the PUCCH resource determination unit 1013 selects any of the first value and the second value depending on whether or not the value of the virtual cell identity for the PUCCH is set by the setting unit 1015, and determines the PUCCH resource based on at least the selected value and the third value. The transmission unit 107 transmits the HARQ-ACK to the transport block on the PUCCH resource.

In a case where the value of the virtual cell identity for the PUCCH is received, the uplink reference signal generation unit 1079 generates the PUCCH and the time-multiplexed DMRS (the reference signal) based on the value of the virtual cell identity for the PUCCH. Furthermore, in a case where the value of the virtual cell identity for the PUCCH is not received, the uplink reference signal generation unit 1079 generates the DMRS (the reference signal) based on the physical layer cell identity. The transmission unit 107 transmits the reference signal.

Described in detail below will be the reception unit 305, the PUCCH resource determination unit 3015, and the transmission unit 307 that construct the base station 3 according to the first embodiment.

The transmission unit 307 transmits information indicating the value of the virtual cell identity for the PUCCH, the first value, the second value, and the third value, transmits the downlink control information that is used on the scheduling of the PDSCH on the PDCCH or the ePDCCH, and transmits the transport block on the PDSCH.

In a case where the transmission unit 307 transmits the downlink control information on the PDCCH, the PUCCH resource determination unit 3015 selects any of the first value and the second value depending on whether or not the transmission unit 307 transmits the information indicating the value of the virtual cell identity for the PUCCH, and determines the PUCCH resource based on at least the selected value.

In the case where the transmission unit 307 transmits the downlink control information on the ePDCCH, the PUCCH resource determination unit 3015 selects any of the first value and the second value depending on whether or not the transmission unit 307 transmits the information indicating the value of the virtual cell identity for the PUCCH, and determines the PUCCH resource based on at least the selected value and the third value. The reception unit 305 receives the HARQ-ACK to the transport block on the PUCCH resource.

Furthermore, in a case where the transmission unit 307 transmits the value of the virtual cell identity for the PUCCH, the reception unit 305 receives from the mobile station 1 the DMRS (the reference signal) that is generated by the mobile station 1 based on the value of the virtual cell identity for the PUCCH, and performs the demodulating processing of the PUCCH based on the DMRS (the reference signal).

Furthermore, in a case where the transmission unit 307 does not transmit the value of the virtual cell identity for the PUCCH, the reception unit 305 receives from the mobile station 1 the DMRS (the reference signal) that is generated by the mobile station 1 based on the value of the physical layer cell identity, and performs the demodulating processing of the PUCCH based on the DMRS (the reference signal).

Accordingly, the mobile station 1 can efficiently transmit the HARQ-ACK to the transport block transmitted on the PDSCH, using the PUCCH. Furthermore, the base station 3 can efficiently receive the HARQ-ACK to the transport block transmitted on the PDSCH, using the PUCCH.

A second embodiment of the present invention will be described below.

The mobile station 1 and the base station 3 according to the second embodiment determine the PUCCH resource for the antenna port $P_0$ using Math. (9) instead of Math. (5) and Math. (7), and determine the PUCCH resource for an antenna port $P_1$ using Math. (10) instead of Math. (6) and Math. (8).

$$n_{PUCCH}^{(1,p0)} = n_{eCCE} + N_{ePDCCH(i)}^{(1)} \quad \text{[Math. 9]}$$

$$n_{PUCCH}^{(1,p1)} = n_{eCCE} + N_{ePDCCH(i)}^{(1)} + 1 \quad \text{[Math. 10]}$$

To be more precise, the mobile station 1 and the base station 3 according to the second embodiment determine the PUCCH resource using Math. (1) to Math. (4), and Math. (9) to Math. (10). $N^{(1)}_{PUCCH}$ (the first value) or $N^{(1)}_{PUCCH\text{-}CoMP}$ (the second value) is used in Math. (5) to Math. (8), but $N^{(1)}_{PUCCH}$ (the first value) or $N^{(1)}_{PUCCH\_comp}$ (the second value) is not used in Math. (9) and Math. (10). Accordingly, each configuration of the mobile station 1 and the base station can be simplified.

Figure 17:
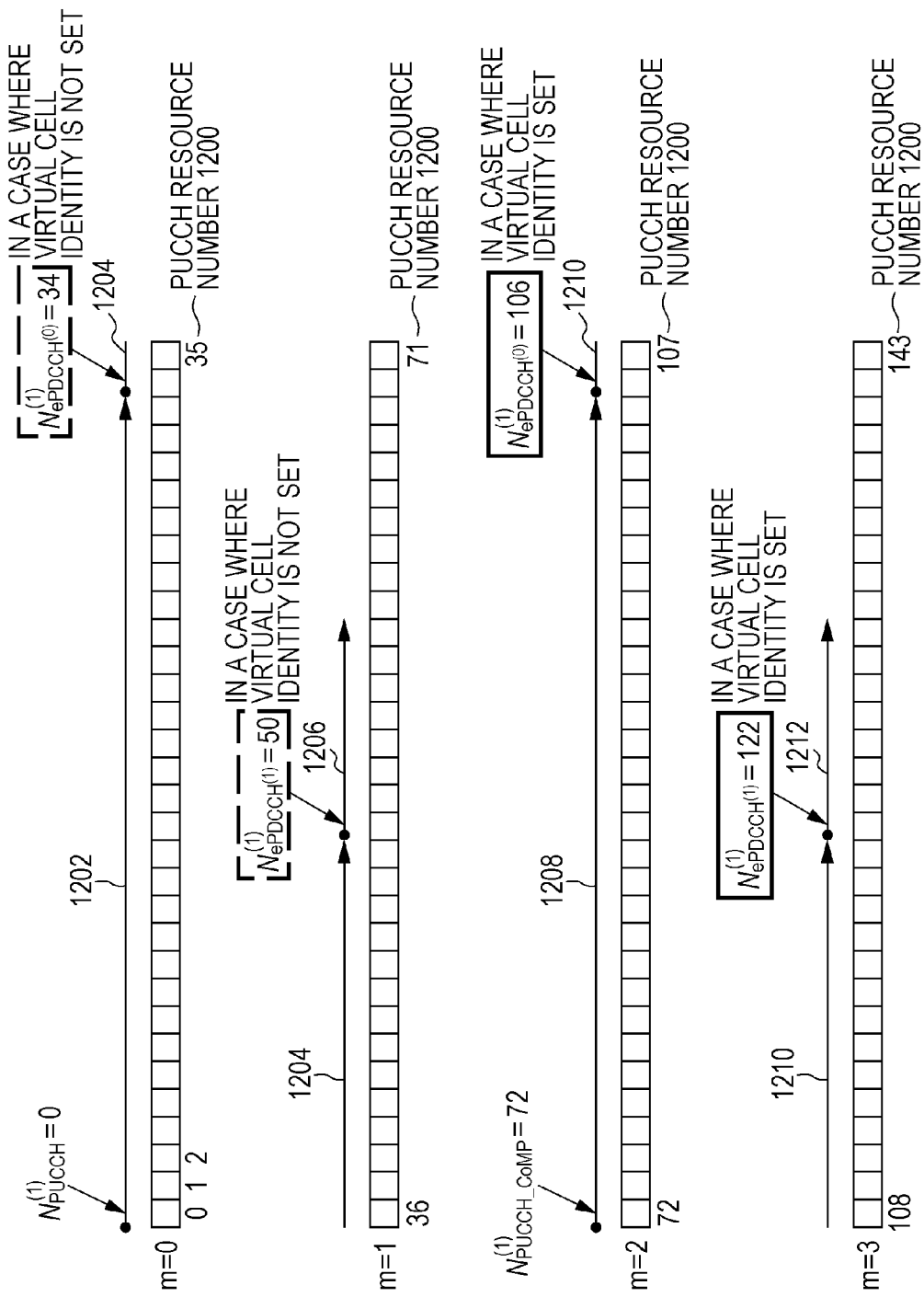
FIG. 17 is a diagram illustrating the correspondence between the PUCCH resource and the CCE/eCCE for the antenna port $p_0$ according to a second embodiment.

FIG. 17 is a diagram illustrating a correspondence between the PUCCH resource and the CCE/eCCE for the antenna port $p_0$ according to the second embodiment. In FIG. 17, m is a number for identifying the physical resource block in the PUCCH resource. In FIG. 17, the code 1200 indicates the PUCCH resource number.

In FIG. 17, it is assumed that the base station 3 can transmit up to 35 CCE's, up to 16 eCCE's for the ePDCCH set 1, and up to 8 eCCE's for the ePDCCH set 2. In FIG. 17, $N^{(1)}_{PUCCH}$ (the first value) is 0 and $N^{(1)}_{PUCCH\_CoMP}$ (the second value) is 72.

In FIG. 17, the base station 3 determines $N^{(1)}_{ePDCCH(1)}$ (the third value) corresponding to the ePDCCH set 1 and a value of $N^{(1)}_{ePDCCH(2)}$ (the third value) corresponding to the ePDCCH set 2, depending on whether or not the information indicating the value of the virtual cell identity is transmitted to the mobile station 1. In FIG. 17, for the mobile station 1 that does not transmit the information indicating the value of the virtual cell identity, the base station 3 determines $N^{(1)}_{ePDCCH(1)}$ (the third value) corresponding to the ePDCCH set 1 as 34, and the value of $N^{(1)}_{ePDCCH(2)}$ (the third value) corresponding to the ePDCCH set 2, as 50. Furthermore, in FIG. 17, for the mobile station 1 that transmits the information indicating the value of the virtual cell identity, the base station 3 determines $N^{(1)}_{ePDCCH(1)}$ (the third value) corresponding to the ePDCCH set 1 to 106, and determines the value of $N^{(1)}_{ePDCCH(2)}$ (the third value) corresponding to the ePDCCH set 2, as 122.

In FIG. 17, in a case where the mobile station 1 does not receive the value of the virtual cell identity and the downlink control information that is used for the scheduling of the PDSCH is received on the PDCCH, a code 1202 indicates the PUCCH resource that has the likelihood of being used by the mobile station 1 in the transmission of the HARQ-ACK. To be more precise, the code 1202 is a range of the PUCCH resource number that is output by Math. (1) in FIG. 17.

In FIG. 17, in a case where the mobile station 1 receives the value of the virtual cell identity and the downlink control information that is used for the scheduling of the PDSCH is received on the PDCCH, a code 1208 indicates the PUCCH resource that has the likelihood of being used by the mobile station 1 in the transmission of the HARQ-ACK. To be more precise, the code 1208 is a range of the PUCCH resource number that is output by Math. (3) in FIG. 17.

In FIG. 17, in a case where the mobile station 1 does not receive the value of the virtual cell identity and the downlink control information that is used for the scheduling of the PDSCH is received on the ePDCCH in the ePDCCH set 1, a code 1204 indicates the PUCCH resource that has the likelihood of being used by the mobile station 1 in the transmission of the HARQ-ACK.

In FIG. 17, in a case where the mobile station 1 does not receive the value of the virtual cell identity and the downlink control information that is used for the scheduling of the PDSCH is received on the ePDCCH in the ePDCCH set 2, the code 1206 indicates the PUCCH resource that has the likelihood of being used by the mobile station 1 in the transmission of the HARQ-ACK.

In FIG. 17, in a case where the mobile station 1 receives the value of the virtual cell identity and the downlink control information that is used for the scheduling of the PDSCH is received on the ePDCCH in the ePDCCH set 1, the code 1210 indicates the PUCCH resource that has the likelihood of being used by the mobile station 1 in the transmission of the HARQ-ACK.

In FIG. 17, in a case where the mobile station 1 receives the value of the virtual cell identity and the downlink control information that is used for the scheduling of the PDSCH is received on the ePDCCH in the ePDCCH set 2, the code 1212 indicates the PUCCH resource that has the likelihood of being used by the mobile station 1 in the transmission of the HARQ-ACK. To be more precise, the code 1204, the code 1206, the code 1210, and the code 1212 are ranges of the PUCCH resource number that is output by Math. (9) in FIG. 17.

As a result, in FIG. 17, the mobile station 1 that does not receive the value of the virtual cell identity transmits the HARQ-ACK on the PUCCH resource where M corresponds to 0 or 1, and the mobile station 1 that receives the value of the virtual cell identity transmits the HARQ-ACK on the PUCCH resource where m corresponds to 1 or 2. To be more precise, because each of the mobile station 1 that does not receive the value of the virtual cell identity and the mobile station 1 that receives the value of the virtual cell identity transmits the PUCCH on different physical resource blocks, interference of the PUCCH signals with each other can be avoided. Furthermore, because the same indexes of the CCE and the eCCE for a PDCCH set i correspond to the PUCCH resources that have different indexes, conflict between the PUCCH resources can be avoided.

In this manner, according to the second embodiment, an effect as is the case with the first embodiment can be obtained.

Operation of each of the mobile station 1 and the base station 3 according to the second embodiment will be described referring to flowcharts.

Figure 18:
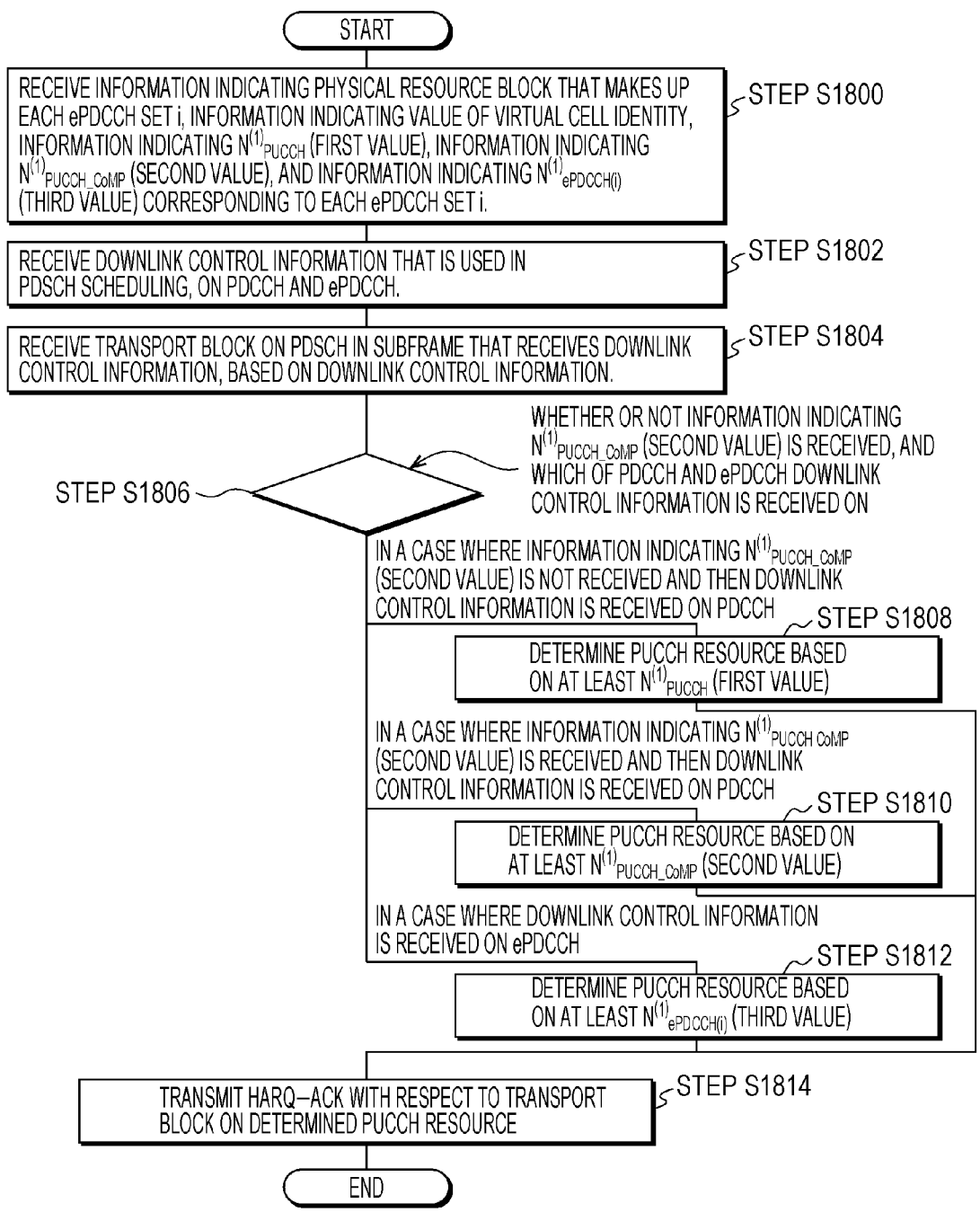
FIG. 18 is a flowchart for describing operation of the mobile station 1 according to the second embodiment.

FIG. 18 is a flowchart for describing the operation of the mobile station 1 according to the second embodiment. The mobile station 1 receives the information indicating the physical resource block that constructs each ePDCCH set i, the information indicating the value of the virtual cell identity, the information indicating $N^{(1)}_{PUCCH}$ (the first value), the information indicating $N^{(1)}_{PUCCH\_CoMP}$ (the second value), and the information indicating $N^{(1)}_{ePDCCH(i)}$ (the third value) corresponding to each ePDCCH set i (Step S1800). Moreover, in Step S1800, the mobile station 1 may not receive one or more of, or all of the information indicating the physical resource block that constructs each ePDCCH set i, the information indicating the value of the virtual cell identity, the information indicating $N^{(1)}_{PUCCH\_CoMP}$ (the second value), and the information indicating $N^{(1)}_{ePDCCH(i)}$ (the third value) corresponding to each ePDCCH set i.

Moreover, the information indicating $N^{(1)}_{ePDCCH(i)}$ (the third value) corresponding to the PDCCH set i is transmitted and received together with the information indicating the physical resource block that constructs the ePDCCH set i. Furthermore, the information indicating $N^{(1)}_{PUCCH\_CoMP}$ (the second value) is transmitted and received together with the information indicating the value of the virtual cell identity.

The mobile station 1 receives the downlink control information that is used in the scheduling of the PDSCH on the PDCCH and on the ePDCCH (Step S1802). Based on the downlink control information, the mobile station 1 receives the transport block on the PDSCH in the subframe in which the downlink control information is received (Step S1804). The mobile station 1 determines whether or not the information indicating $N^{(1)}_{PUCCH\_CoMP}$ (the second value) is received, and which of the PDCCH and the ePDCCH the downlink control information is received on (Step S1806).

In the case where the information indicating $N^{(1)}_{PUCCH\_CoMP}$ (the second value) is not received and the downlink control information is received on the PDCCH, the mobile station 1 determines the PUCCH resource based on at least $N^{(1)}_{PUCCH}$ (the first value) (Step S1808).

In the case where the information indicating $N^{(1)}_{PUCCH\_CoMP}$ (the second value) is received and the downlink control information is received on the PDCCH, the mobile station 1 determines the PUCCH resource based on at least $N^{(1)}_{PUCCH\_CoMP}$ (the second value) (Step S1810).

Regardless of whether or not the information indicating $N^{(1)}_{PUCCH\_CoMP}$ (the second value) is received, in a case where the downlink control information is received on the ePDCCH, the mobile station 1 determines the PUCCH resource based on at least $N^{(1)}_{ePDCCH(i)}$ (the third value) (Step S1812).

The mobile station 1 transmits the HARQ-ACK to the transport block, on the determined PUCCH resource (Step S1314).

Figure 19:
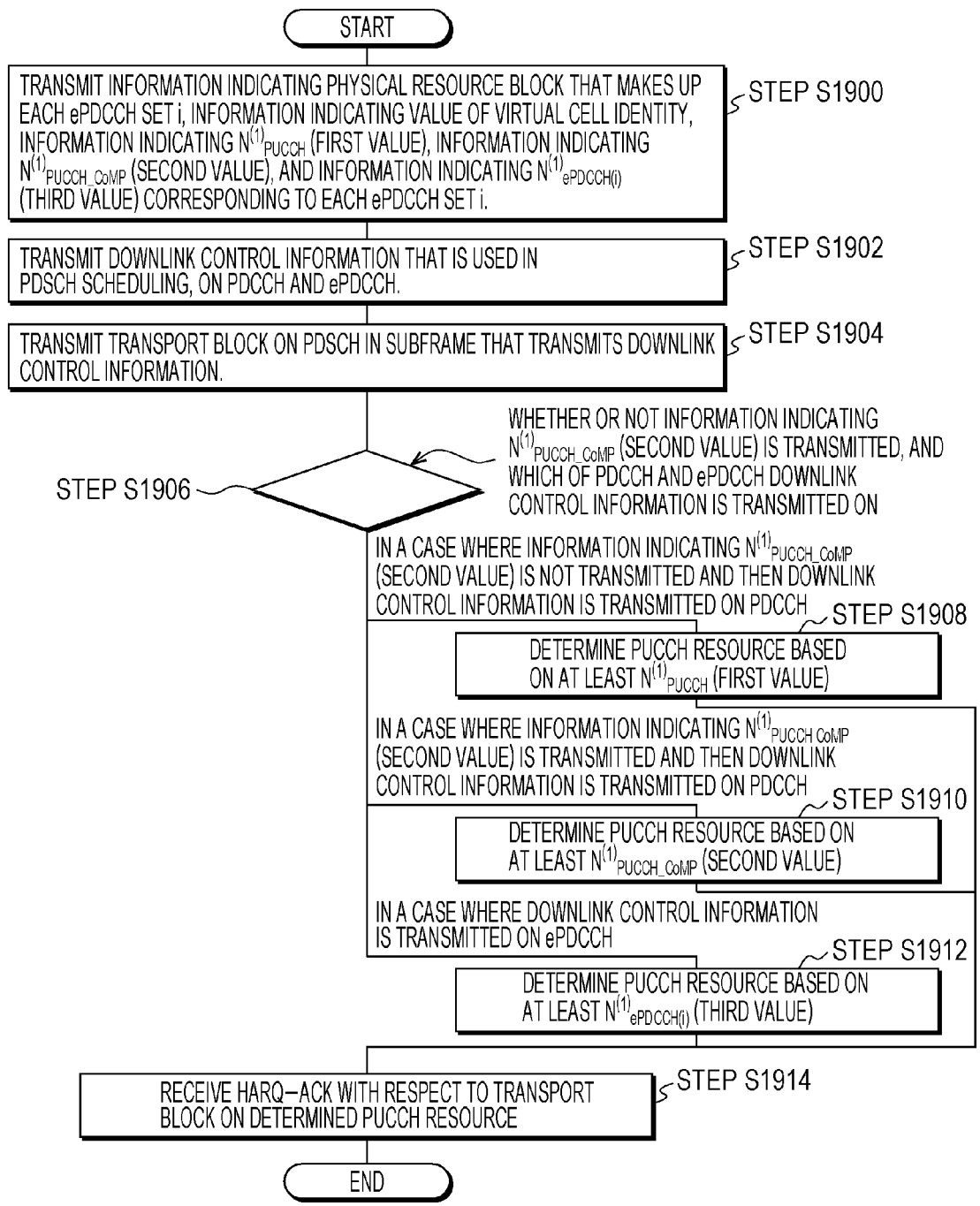
FIG. 19 is a flowchart for describing operation of the base station 3 according to the second embodiment.

FIG. 19 is a flowchart for describing the operation of the base station 3 according to the second embodiment. The base station 3 transmits to the mobile station 1 the information indicating the physical resource block that constructs each ePDCCH set i, the information indicating the value of the virtual cell identity, the information indicating $N^{(1)}_{PUCCH}$ (the first value), the information indicating $N^{(1)}_{PUCCH\_CoMP}$ (the second value), and the information indicating $N^{(1)}_{ePDCCH(i)}$ (the third value) corresponding to each ePDCCH set i (Step S1900). Moreover, in Step S1900, the base station 3 may not transmit to the base mobile station 1 one or more of, or all of the information indicating the physical resource block that constructs each ePDCCH set i, the information indicating the value of the virtual cell identity, the information indicating $N^{(1)}_{PUCCH\_CoMP}$ (the second value), and the information indicating $N^{(1)}_{ePDCCH(i)}$ (the third value) corresponding to each ePDCCH set i.

The base station 3 transmits to the mobile station 1 the downlink control information that is used in the scheduling of the PDSCH on the PDCCH and on the ePDCCH (Step S1902). The base station 3 transmits to the mobile station 1 the transport block on the PDSCH in the subframe in which the downlink control information is transmitted (Step S1904). The base station 3 determines whether or not the information indicating $N^{(1)}_{PUCCH\_CoMP}$ (the second value) is transmitted, and which of the PDCCH and the ePDCCH the downlink control information is transmitted on (Step S1906).

In a case where the information indicating $N^{(1)}_{PUCCH\_CoMP}$ (the second value) is not transmitted and the downlink control information is transmitted on the PDCCH, the base station 3 determines the PUCCH resource based on at least $N^{(1)}_{PUCCH}$ (the first value) (Step S1908).

In the case where the information indicating $N^{(1)}_{PUCCH\_CoMP}$ (the second value) is transmitted and the downlink control information is transmitted on the PDCCH, the base station 3 determines the PUCCH resource based on at least $N^{(1)}_{PUCCH\_CoMP}$ (the second value) (Step S1910).

Regardless of whether or not the information indicating $N^{(1)}_{PUCCH\_CoMP}$ (the second value) is transmitted, in the case where the downlink control information is transmitted on the ePDCCH, the base station 3 determines the PUCCH resource based on $N^{(1)}_{ePDCCH(i)}$ (the third value) that corresponds to the ePDCCH set i that transmits the ePDCCH (Step S1912).

The base station 3 receives the HARQ-ACK to the transport block, on the determined PUCCH resource (Step S1912).

A device configuration according to the second embodiment will be described below.

Configurations of the mobile station 1 and the base station 3 according to the second embodiment are the same as those according to the first embodiment in FIGS. 15 and 16, and thus are not newly illustrated.

Among functions and functional blocks of the mobile station 1 and the base station 3 according to the second embodiment, functions and functional blocks that are not described according to the second embodiment are the same as those of the mobile station 1 and the base station 3 according to the first embodiment.

Described in detail below will be each operation of the reception unit 105, the detection unit 1061, the PUCCH resource determination unit 1013, the setting unit 1015, and the transmission unit 107 that construct the mobile station 1 according to the second embodiment.

The setting unit 1015 sets the value of the virtual cell identity, the first value, the second value, and the third value for the PUCCH, based on the signaling received from the base station. The detection unit 1061 detects the downlink control information that is used for the scheduling of the PDSCH, with the PDCCH or the ePDCCH. The reception unit 105 receives the transport block on the PDSCH.

In a case where the detection unit 1061 detects the downlink control information with the PDCCH, the PUCCH resource determination unit 1013 selects any of the first value and the second value depending on whether or not the value of the virtual cell identity for the PUCCH is set by the setting unit 1015, and determines the PUCCH resource based on at least the selected value. Furthermore, in the case where the detection unit 1061 detects the downlink control information with the ePDCCH, regardless of whether or not the value of the virtual cell identity for the PUCCH is set by the setting unit 1015, the PUCCH resource determination unit 1013 determines the PUCCH resource based on at least the third value. The transmission unit 107 transmits the HARQ-ACK for the transport block on the PUCCH resource.

Described in detail below will be the reception unit 305, the PUCCH resource determination unit 3015, and the transmission unit 307 that construct the base station 3 according to the second embodiment.

The transmission unit 307 transmits information indicating the value of the virtual cell identity for the PUCCH, the first value, the second value, and the third value, transmits the downlink control information that is used on the scheduling of the PDSCH on the PDCCH or the ePDCCH, and transmits the transport block on the PDSCH.

In a case where the transmission unit 307 transmits the downlink control information on the PDCCH, the PUCCH resource determination unit 3015 selects any of the first value and the second value depending on whether or not the transmission unit 307 transmits the information indicating the value of the virtual cell identity for the PUCCH, and determines the PUCCH resource based on at least the selected value. In the case where the transmission unit 307 transmits the downlink control information on the ePDCCH, regardless of whether or not the transmission unit 307 transmits the information indicating the value of the virtual cell identity for the PUCCH, the PUCCH resource determination unit 3015 determines the PUCCH resource based on at least the third value. The reception unit 305 receives the HARQ-ACK to the transport block on the PUCCH resource.

Accordingly, the mobile station 1 can efficiently transmit the HARQ-ACK to the transport block transmitted on the PDSCH, using the PUCCH. Furthermore, the base station 3 can efficiently receive the HARQ-ACK to the transport block transmitted on the PDSCH, using the PUCCH.

Moreover, according to the embodiments described above, the mobile station 1 and the base station 3 determine the PUCCH resource based on Math. (5) to Math. (10), but the present invention is not limited to this. In order for the mobile station 1 and the base station 3 to determine the PUCCH resource, other expressions may be used that are defined by at least the index of the eCCE and the third value. For example, on the left side of each of Math. (5) to Math. (10), an expression can be used such as one that adds (or subtracts) more other parameters (offset values).

At this point, as other parameters, there are available an offset value that is designated by bits of predetermined information that is included in the downlink control information (the DCI format) that is used in the scheduling of the PDSCH, a value that is calculated based on a number of an antenna port that is used in the transmission of the ePDCCH in which the downlink control information that is used in the scheduling of the PDSCH is arranged, a value that is calculated based on numbers (Radio Network Temporary Identifier (RNTI), Cell-Radio Network Temporary Identifier (C-RNTI)) that is assigned to a user, a value that is calculated based on the number of the antenna port that is used in the transmission of the ePDCCH in which the downlink control information that is used in the scheduling of the PDSCH is arranged and on a number that is assigned to the user, and the like, and a combination of these values.

A program running on the base station 3 and the mobile station 1 according to the present invention may be a program (a program for causing a computer to operate) that controls a Central Processing Unit (CPU) and the like in such a manner as to realize the functions according to the embodiments of the present invention, which are described above. Then, the information that is handled in these devices is temporarily stored in a Random Access Memory (RAM) while being processed. Thereafter, the information is stored in various types of ROM such as a Flash Read Only Memory (ROM) or a Hard Disk Drive (HDD) and, whenever necessary, is read by the CPU to be modified or rewritten.

Moreover, one portion of each of the mobile station 1 and the base station 3 according to the embodiments, which are described above, may be realized by the computer. In that case, this one portion may be realized by recording a program for realizing such control functions on a computer-readable medium and causing a computer system to read the program stored on the recording medium for execution.

Moreover, the "computer system" here is defined as a computer system built into the mobile station 1 or the base station 3 and as including an OS or hardware components such as a peripheral device. Furthermore, the "computer-readable recording medium" refers to a portable medium such as a flexible disk, a magneto-optical disk, a ROM, and a CD-ROM, and a storage device such as a hard disk that is built into the computer system.

Moreover, the "computer-readable recording media" may include a medium that dynamically retains the program for a short period of time, such as a communication line that is used when transmitting the program over a network such as the Internet or over a communication circuit such as a telephone circuit and a medium that retains the program for a fixed period of time, such as a volatile memory within the computer system, which functions as a server or a client in a case of including the program dynamically. Furthermore, the program may be one for realizing some of the functions described above and additionally may be one that can realize the functions described above in combination with a program that is already recorded on the computer system.

Furthermore, the base station 3 according to the embodiments, which are described above, can be realized as an aggregation (a device group) that is configured from multiple devices. Each device that constructs the device group may be equipped with some portion of or all portions of each function or each functional block of the base station 3 according to the embodiment, which is described. The device group itself may have each general function or each general functional block of the base station 3. Furthermore, the mobile station 1 according to the embodiments, which are described, can also communicate with the base station as the aggregation.

Furthermore, some portions of or all portions of each of the mobile station 1 and the base station 3 according to the embodiment, which are described, may be realized as an LSI that is a typical integrated circuit and may be realized as a chip set. Each functional block of each of the mobile station 1 and the base station 3 may be individually realized as a chip, and some of, or all of the functional blocks may be integrated into a chip. Furthermore, a circuit integration technique is not limited to the LSI, and an integrated circuit for the functional block may be realized with a dedicated circuit or a general-purpose processor. Furthermore, if with advances in semiconductor technology, a circuit integration technology with which an LSI is replaced appears, it is also possible to use an integrated circuit to which such a technology is applied.

Furthermore, according to the embodiments, as described above, the mobile station is described as one example of a terminal or a communication device, but the present invention is not limited to this, and can be applied also to a terminal apparatus or a communication apparatus, such as a fixed-type electronic apparatus that is installed indoors or outdoors, or a stationary-type electronic apparatus, for example, an AV apparatus, a kitchen apparatus, a cleaning or washing machine, an air-conditioning apparatus, office equipment, a vending machine, and other household apparatuses.

The embodiments of the invention are described in detail above referring to the drawings, but the specific configuration is not limited to the embodiments and includes an amendment to a design that falls within a scope that does not depart from the gist of the present invention. Furthermore, various modifications are possible within the scope of the present invention defined by claims, and embodiments that are made by suitably combining technical means disclosed according to the different embodiments are also included in the technical scope of the present invention. Furthermore, a configuration in which a constituent element that achieves the same effect is substituted for the one that is described according to each of the embodiments is also included in the technical scope of the present invention.

INDUSTRIAL APPLICABILITY

Description of Reference Numerals 1 (1A, 1B, 1C) MOBILE STATION
3 BASE STATION
101 HIGHER LAYER PROCESSING UNIT
103 CONTROL UNIT
105 RECEPTION UNIT
107 TRANSMISSION UNIT
109 TRANSMIT AND RECEIVE ANTENNA
1011 RADIO RESOURCE CONTROL UNIT
1013 PUCCH RESOURCE DETERMINATION UNIT
1015 SETTING UNIT
1051 DECODING UNIT
1053 DEMODULATION UNIT
1055 DEMULTIPLEXING UNIT
1057 RADIO RECEPTION UNIT
1059 CHANNEL MEASUREMENT UNIT
1061 DETECTION UNIT
1071 CODING UNIT
1073 MODULATION UNIT
1075 MULTIPLEXING UNIT
1077 RADIO TRANSMISSION UNIT
1079 UPLINK REFERENCE SIGNAL GENERATION UNIT
301 HIGHER LAYER PROCESSING UNIT
303 CONTROL UNIT
305 RECEPTION UNIT
307 TRANSMISSION UNIT
309 TRANSMIT AND RECEIVE ANTENNA
3011 RADIO RESOURCE CONTROL UNIT
3013 SCHEDULING UNIT
3015 PUCCH RESOURCE DETERMINATION UNIT
3051 DECODING UNIT
3053 DEMODULATION UNIT
3055 DEMULTIPLEXING UNIT
3057 RADIO RECEPTION UNIT
3059 CHANNEL MEASUREMENT UNIT
3071 CODING UNIT
3073 MODULATION UNIT
3075 MULTIPLEXING UNIT
3077 RADIO TRANSMISSION UNIT
3079 DOWNLINK REFERENCE SIGNAL GENERATION UNIT

The invention claimed is:

1. A terminal apparatus comprising:

a detection processor configured and/or programmed to:
  monitor a physical downlink control channel (PDCCH) with downlink control information, the downlink control information being used for scheduling of a physical downlink shared channel (PDSCH); and
  monitor an enhanced physical downlink control channel (ePDCCH) with the downlink control information;

a reception processor configured and/or programmed to:
  receive the PDSCH scheduled by the downlink control information;
  receive a system information block which includes information indicating a first value, the first value being common among terminal apparatuses in a cell;
  receive information indicating a second value of a terminal apparatus specific PUCCH resource offset and information indicating a value of a virtual cell identity for a PUCCH in a same higher layer signal; and
  receive information indicating a third value of a PUCCH resource offset for an ePDCCH set; and a transmission processor configured and/or programmed to transmit a HARQ-ACK for the PDSCH on a PUCCH resource, wherein for the PDSCH transmission indicated by the detection of the PDCCH with the downlink control information, the PUCCH resource is based on at least the first value in a case where the second value is not configured, for the PDSCH transmission indicated by the detection of the PDCCH with the downlink control information, the PUCCH resource is based on at least the second value in a case where the second value is configured, and for the PDSCH transmission indicated by the detection of the ePDCCH with the downlink control information, the PUCCH resource is based on at least the third value for the ePDCCH set where the ePDCCH with the downlink control information is detected, regardless of whether or not the second value is configured.

2. The terminal apparatus according to claim 1, further comprising:
a generation processor configured and/or programmed to:
generate a reference signal based on the value of the virtual cell identity for the PUCCH in a case where the value of the virtual cell identity for the PUCCH is configured; and
generate a reference signal based on a physical layer cell identity in a case where the value of the virtual cell identity for the PUCCH is not configured, wherein
the reference signal is associated with the PUCCH.

3. A base station apparatus comprising:
a transmission processor configured and/or programmed to:
transmit downlink control information on a physical downlink control channel (PDCCH) or on an enhanced physical downlink control channel (ePDCCH), the downlink control information being used for scheduling of a physical downlink shared channel (PDSCH); and
transmit the PDSCH scheduled by the downlink control information;
transmit a system information block which includes information indicating a first value, the first value being common among terminal apparatuses in a cell;
transmit information indicating a second value of a terminal apparatus specific PUCCH resource offset and information indicating a value of a virtual cell identity for a PUCCH in a same higher layer signal; and
transmit information indicating a third value of a PUCCH resource offset for an ePDCCH set; and
a reception processor configured and/or programmed to receive a HARQ-ACK for the PDSCH on a PUCCH resource, wherein
for the PDSCH transmission scheduled by the downlink control information transmitted on the PDCCH, the PUCCH resource is based on at least the first value in a case where the information indicating the second value is not transmitted,
for the PDSCH transmission scheduled by the downlink control information transmitted on the PDCCH, the PUCCH resource is based on at least the second value in a case where the information indicating the second value is transmitted, and
for the PDSCH transmission scheduled by the downlink control information transmitted on the ePDCCH, the PUCCH resource is based on at least the third value for the ePDCCH set where the ePDCCH with the downlink control information is transmitted, regardless of whether or not the information indicating the second value is transmitted.

4. The base station apparatus according to claim 3, wherein
the reception processor is configured and/or programmed to receive a reference signal that is generated by the terminal apparatus based on the value of the virtual cell identity in a case where the information indicating the value of the virtual cell identity is transmitted,
the reception unit receives the reference signal that is generated by the terminal apparatus based on a value of a physical layer cell identity in a case where the information indicating the value of the virtual cell identity is not transmitted, and
the reference signal is associated with the PUCCH.

5. A wireless communication method that is used in a terminal apparatus, the method comprising:
monitoring a physical downlink control channel (PDCCH) with downlink control information, the downlink control information is used for scheduling of a physical downlink shared channel (PDSCH);
monitoring an enhanced physical downlink control channel (ePDCCH) with the downlink control information;
receiving the PDSCH scheduled by the downlink control information;
receiving a system information block which includes information indicating a first value, the first value being common among terminal apparatuses in a cell;
receiving information indicating a second value of a terminal apparatus specific PUCCH resource offset and information indicating a value of a virtual cell identity for a PUCCH in a same higher layer signal;
receiving information indicating a third value of a PUCCH resource offset for an ePDCCH set; and
transmitting a HARQ-ACK for the PDSCH on a PUCCH resource, wherein
for the PDSCH transmission indicated by the detection of the PDCCH with the downlink control information, a PUCCH resource is based on at least the first value in a case where the second value is not configured,
for the PDSCH transmission indicated by the detection of the PDCCH with the downlink control information, the PUCCH resource is based on at least the second value in a case where the second value is configured, and
for the PDSCH transmission indicated by the detection of the ePDCCH with the downlink control information, the PUCCH resource based on at least the third value for the ePDCCH set where the ePDCCH with the downlink control information is detected, regardless of whether or not the second value is configured.

6. The wireless communication method according to claim 5, further comprising:
generating a reference signal based on the value of the virtual cell identity for the PUCCH in a case where the value of the virtual cell identity for the PUCCH is configured; and
generating the reference signal based on a physical layer cell identity in a case where the value of the virtual cell identity for the PUCCH is not configured, wherein
the reference signal is associated with the PUCCH.

7. A wireless communication method that is used in a base station apparatus, the method comprising:
transmitting downlink control information on a physical downlink control channel (PDCCH) or on an enhanced physical downlink control channel (ePDCCH), the downlink control information being used for scheduling of a physical downlink shared channel (PDSCH);
transmitting the PDSCH scheduled by the downlink control information;
transmitting a system information block which includes information indicating a first value, the first value being common among terminal apparatuses in a cell;
transmitting information indicating a second value of a terminal apparatus specific PUCCH resource offset and information indicating a value of a virtual cell identity for a PUCCH in a same higher layer signal;
transmitting information indicating a third value of a PUCCH resource offset for an ePDCCH set; and
receiving a HARQ-ACK for the PDSCH on a PUCCH resource
for the PDSCH transmission scheduled by the downlink control information transmitted on the PDCCH, the PUCCH resource is based on at least the first value in a case where information indicating the second value is not transmitted, wherein
for the PDSCH transmission scheduled by the downlink control information transmitted on the PDCCH, the PUCCH resource is based on at least the second value in a case where the information indicating the second value is transmitted;

for the PDSCH transmission scheduled by the downlink control information transmitted on the ePDCCH, the PUCCH resource is based on at least the third value for the ePDCCH set where the ePDCCH with the downlink control information is transmitted, regardless of whether or not the information indicating the second value is transmitted.

8. The wireless communication method according to claim 7, further comprising:

receiving a reference signal that is generated by the terminal apparatus based on the value of the virtual cell identity in a case where the information indicating the value of the virtual cell identity is transmitted; and receiving the reference signal that is generated by the terminal apparatus based on a value of a physical layer cell identity in a case where the information indicating the value of the virtual cell identity is not transmitted, wherein the reference signal is associated with the PUCCH.

9. An integrated circuit mounted in a terminal apparatus, comprising:

a detection processor configured and/or programmed to:
monitor a physical downlink control channel (PDCCH) with downlink control information, the downlink control information being used for scheduling of a physical downlink shared channel (PDSCH); and
monitor an enhanced physical downlink control channel (ePDCCH) with the downlink control information;

a reception processor configured and/or programmed to:
receive the PDSCH scheduled by the downlink control information;
receive a system information block which includes information indicating a first value, the first value being common among terminal apparatuses in a cell;
receive information indicating a second value of a terminal apparatus specific PUCCH resource offset and information indicating a value of a virtual cell identity for a PUCCH in a same higher layer signal; and
receive information indicating a third value of a PUCCH resource offset for an ePDCCH set; and a transmission processor configured and/or programmed to transmit a HARQ-ACK for the PDSCH on a PUCCH resource, wherein for the PDSCH transmission indicated by the detection of the PDCCH with the downlink control information, the PUCCH resource is based on at least the first value in a case where the second value is not configured, for the PDSCH transmission indicated by the detection of the PDCCH with the downlink control information, the PUCCH resource is based on at least the second value in a case where the second value is configured, and for the PDSCH transmission indicated by the detection of the ePDCCH with the downlink control information, the PUCCH resource is based on at least the third value for the ePDCCH set where the ePDCCH with the downlink control information is detected, regardless of whether or not the second value is configured.

10. The integrated circuit according to claim 9, further comprising:

a generation processor configured and/or programmed to:
generate a reference signal based on the value of the virtual cell identity for the PUCCH in a case where the value of the virtual cell identity for the PUCCH is configured; and
generate a reference signal based on a physical layer cell identity in a case where the value of the virtual cell identity for the PUCCH is not configured, wherein the reference signal is associated with the PUCCH.

11. An integrated circuit mounted in a base station apparatus, comprising:

a transmission processor configured and/or programmed to:
transmit downlink control information on a physical downlink control channel (PDCCH) or on an enhanced physical downlink control channel (ePDCCH), the downlink control information being used for scheduling of a physical downlink shared channel (PDSCH); and
transmit the PDSCH scheduled by the downlink control information;
transmit a system information block which includes information indicating a first value, the first value being common among terminal apparatuses in a cell;
transmit information indicating a second value of a terminal apparatus specific PUCCH resource offset and information indicating a value of a virtual cell identity for a PUCCH in a same higher layer signal; and
transmit information indicating a third value of a PUCCH resource offset for an ePDCCH set; and a reception processor configured and/or programmed to receive a HARQ-ACK for the PDSCH on a PUCCH resource, wherein for the PDSCH transmission scheduled by the downlink control information transmitted on the PDCCH, the PUCCH resource is based on at least the first value in a case where the information indicating the second value is not transmitted, for the PDSCH transmission scheduled by the downlink control information transmitted on the PDCCH, the PUCCH resource is based on at least the second value in a case where the information indicating the second value is transmitted, and for the PDSCH transmission scheduled by the downlink control information transmitted on the ePDCCH, the PUCCH resource is based on at least the third value for the ePDCCH set where the ePDCCH with the downlink control information is transmitted, regardless of whether or not the information indicating the second value is transmitted.

12. The integrated circuit according to claim 11, wherein the reception processor is configured and/or programmed to receive a reference signal that is generated by the terminal apparatus based on the value of the virtual cell identity in a case where the information indicating the value of the virtual cell identity is transmitted, the reception unit receives the reference signal that is generated by the terminal apparatus based on a value of a physical layer cell identity in a case where the information indicating the value of the virtual cell identity is not transmitted, and the reference signal is associated with the PUCCH.

* * * * *